(12) United States Patent
Sennoun

(10) Patent No.: US 12,237,488 B2
(45) Date of Patent: Feb. 25, 2025

(54) TEMPERATURE CONTROL MECHANISM FOR AN ELECTRICAL COMPONENT

(71) Applicant: General Electric Company, Schenectady, NY (US)

(72) Inventor: Mohammed El Hacin Sennoun, West Chester, OH (US)

(73) Assignee: General Electric Company, Evendale, OH (US)

( * ) Notice: Subject to any disclaimer, the term of this patent is extended or adjusted under 35 U.S.C. 154(b) by 633 days.

(21) Appl. No.: 17/601,959

(22) PCT Filed: May 20, 2020

(86) PCT No.: PCT/US2020/033677
§ 371 (c)(1),
(2) Date: Oct. 7, 2021

(87) PCT Pub. No.: WO2020/236854
PCT Pub. Date: Nov. 26, 2020

(65) Prior Publication Data
US 2022/0209331 A1 Jun. 30, 2022

Related U.S. Application Data

(60) Provisional application No. 62/850,635, filed on May 21, 2019.

(51) Int. Cl.
| | | |
|---|---|---|
| H01M 10/6557 | (2014.01) | |
| H01G 11/10 | (2013.01) | |
| H01G 11/18 | (2013.01) | |
| H01M 10/613 | (2014.01) | |
| H01M 10/625 | (2014.01) | |
| H01M 10/643 | (2014.01) | |
| H01M 50/213 | (2021.01) | |

(52) U.S. Cl.
CPC ........ *H01M 10/6557* (2015.04); *H01G 11/10* (2013.01); *H01G 11/18* (2013.01); *H01M 10/613* (2015.04); *H01M 10/625* (2015.04); *H01M 10/643* (2015.04); *H01M 50/213* (2021.01); *H01M 2220/20* (2013.01)

(58) Field of Classification Search
CPC ........... H01M 10/6557; H01M 10/613; H01M 10/625; H01M 10/643; H01M 50/213; H01M 2220/20; H01G 11/10; H01G 11/18
See application file for complete search history.

(56) References Cited

U.S. PATENT DOCUMENTS

| | | |
|---|---|---|
| 6,087,038 A | 7/2000 | Flament et al. |
| 6,228,524 B1 | 5/2001 | Kohler et al. |
| 6,512,347 B1 | 1/2003 | Hellmann et al. |
| 7,291,420 B2 | 11/2007 | Bitsche et al. |
| 7,531,269 B2 | 5/2009 | Wegner |
| 8,795,869 B2 | 8/2014 | Caumont et al. |
| 8,906,531 B2 | 12/2014 | Caumont et al. |
| 9,520,625 B2 | 12/2016 | Ganz et al. |
| 2005/0170241 A1* | 8/2005 | German .............. H01M 10/663 429/120 |
| 2010/0005867 A1 | 1/2010 | Doerr |
| 2011/0212356 A1 | 9/2011 | Tennessen et al. |
| 2013/0196184 A1 | 8/2013 | Faass et al. |
| 2016/0167678 A1* | 6/2016 | Jestin ..................... B60L 50/40 318/504 |
| 2017/0194678 A1 | 7/2017 | Yang |
| 2017/0229749 A1 | 8/2017 | Rawlinson et al. |
| 2018/0294536 A1 | 10/2018 | Kruszelnicki |
| 2018/0356161 A1 | 12/2018 | Rousseau et al. |
| 2019/0296314 A1* | 9/2019 | Hartmann ........... H01M 50/503 |

FOREIGN PATENT DOCUMENTS

| | | |
|---|---|---|
| DE | 102016102139 A1 | 8/2017 |
| JP | 2005285455 A | 10/2005 |
| WO | WO2012130406 A1 | 10/2012 |

OTHER PUBLICATIONS

2014 Formula 1 Rule Change New Power Unit (1.6 V6) with ERS, 18 Pages. http://www.formula1-dictionary.net/engine_power_unit_and_ers.html.
Alt Energy Autos, Bosch Thermal Management System Boosts EV Range, Sep. 26, 2015, 2 Pages. (Abstract Only) https://altenergyautos.blogspot.com/2015/09/bosch-thermal-managemen-boosts.html.
Bower, Tesla or GM: Who Has The Best Battery Thermal Management, Insideevs, Dec. 4, 2015, 4 Pages. https://insideevs.com/tesla-or-gm-who-has-the-best-battery-thermal-management-bower/.
Caricos, 2016 Chevrolet Malibu, Image 14, 2016 Chevrolet Malibu Hybrid, Lithium-Ion Battery System, p. 1. https://www.caricos.com/cars/c/chevrolet/2006_chevrolet_malibu/images/14.html.
Gordon, Hybrid Service is Not Rocket Science, Auto Service Professional Magazine, Jun. 9, 2017, 8 Pages. https://www.autoserviceprofessinal.com/article/97984/hybrid-services-is-not-rocket-science.
Larsen, Lattice Energy LLC—Technical Discussion—Oct. 1 Tesla Motors Model S Battery Thermal Runaway, Oct. 16, 2013. (Web Link Only) https://www.slideshare.net/lewisglarsen/lattice-energy-llc-technical-discussionoct-1-tesla-motors-model-s-battery-thermal-runawayoctober-16-2013.
Padgett, Audi Details Battery Life for 2019 e-tron Electric SUV, Green Car Reports, Apr. 20, 2018. (Web Link Only) https://www.greencarreports.com/news/1116347_audi-details-battery-for-2019-e-tron-electric-suv.

(Continued)

*Primary Examiner* — Muhammad S Siddiquee
(74) *Attorney, Agent, or Firm* — Dority & Manning, P.A.

(57) ABSTRACT

A temperature control mechanism for an electrical component having a plurality of cells each defining a longitudinal axis is provided. The temperature control mechanism includes a plurality of temperature control portions that respectively surround the plurality of cells, each of the plurality of temperature control portions respectively extend along the longitudinal axis of the plurality of cells in a first direction from a cell first side to a cell second side, wherein the plurality of temperature control portions are configured to simultaneously receive a temperature control fluid such that the plurality of temperature control portions provide temperature control to the plurality of cells in parallel.

18 Claims, 17 Drawing Sheets

(56) References Cited

OTHER PUBLICATIONS

Roper, Tesla Model S, Jan. 28, 2019, 6 Pages. http://www.roperld.com/science/teslamodels.htm.

Skienet, WK057's, Projects Tesla, Pics and Info: Inside the Tesla 100K Battery Pack, Jan. 24, 2017. (Web Link Only) http://skie.net/skynet/projects/tesla/view_post/20_Pics+and+Info:+Inside+the+Tesla+100kWh+Battery+Pack.

Tesla Motor Club, Battery Temperature Management, Tesla Forum, Model 3, 11 Pages. https://teslamotorsclub.com/tmc/threads/battery-temperature-management.70726/.

Wang, et al., Surrogate based multidisciplinary design optimization of lithium-ion battery thermal management system in electric vehicles, Structural and Multidisciplinary Optimization, ResearchGate, Dec. 2017, vol. 56, Issue 6, pp. 1555-1570. (Abstract Only) https://link.springer.com/article/10.1007%2Fs00158-017-1733-1 https://www.researchgate.net/publication/318171024_Surrogate_based_multidisciplinary_design_optimization-of_lithium_ion_battery_thermal_management_system_in_electric_vehicles.

\* cited by examiner

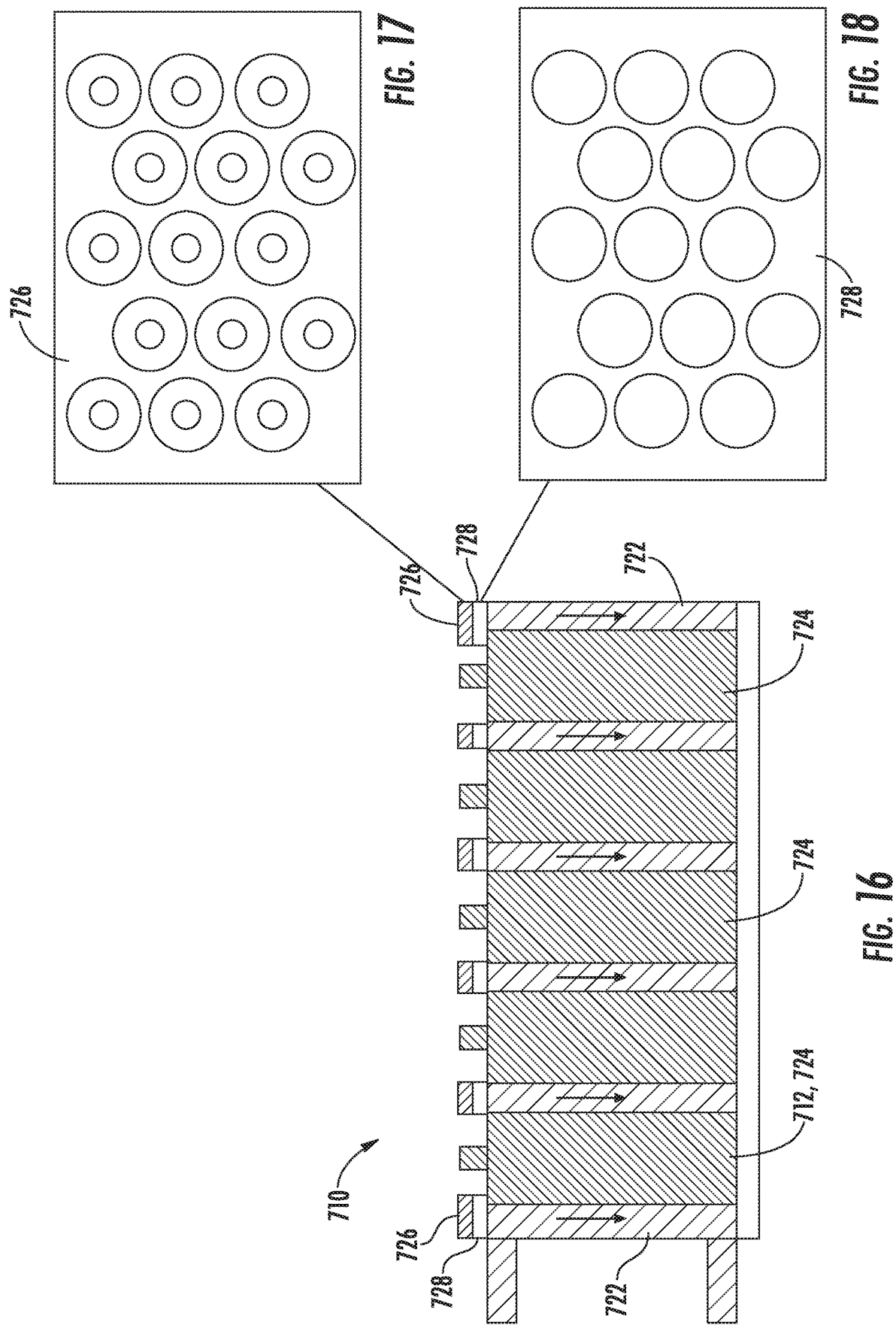

TEMPERATURE CONTROL MECHANISM FOR AN ELECTRICAL COMPONENT

CROSS-REFERENCE TO RELATED APPLICATIONS

The present application claims the benefit of the earliest available effective filing date of U.S. Provisional Patent Application No. 62/850,635 having a filing date of May 21, 2019, of which is incorporated herein by reference in its entirety.

FIELD

The present subject matter relates generally to a temperature control mechanism for an electrical component and a method of operating the same.

BACKGROUND

Electric vehicles and other electrical devices contain and use large battery packs that supply the required electricity for such devices. These battery packs generate lots of heat when the battery is being used. The generated heat must be removed and dissipated in order to improve battery performance and extend battery life.

In conventional systems, the cooling fluid, e.g., liquid or gas, travels through a channel that snakes around multiple rows of battery cells, cooling only a portion of the cylindrical area of a battery. For example, the cooling fluid travels in a serpentine path between every other row of cells and only traveling over a portion of a lateral side of each individual cell. This leads to significant thermal gradients and differences in the temperatures at different sections of the battery pack. For example, the battery sections closest to a coolant inlet portion will see a cooler fluid than the battery sections farther away from the inlet portion. These battery sections that are farther away from the inlet portion will see a warmer fluid which has a lower cooling capacity. Furthermore, in conventional systems, the entire battery cell area is not exposed to a cooling fluid. For example, only a portion of a lateral side of each battery cell will be exposed to coolant in the manner described above. Another disadvantage with conventional systems is the length of the single snaking channel which leads to significant temperature rise of the cooling fluid along its path. The single channel is used to cool all of the portions of the battery pack. The life of the battery is sensitive to temperature and temperature uniformity. Large temperature gradients and differences at different sections of the battery pack are bad for battery life.

BRIEF DESCRIPTION

Aspects and advantages of the invention will be set forth in part in the following description, or may be obvious from the description, or may be learned through practice of the invention.

In one exemplary embodiment of the present disclosure, a temperature control mechanism for an electrical component having a plurality of cells each defining a longitudinal axis is provided. The temperature control mechanism includes a plurality of temperature control portions that respectively surround the plurality of cells, each of the plurality of temperature control portions respectively extend along the longitudinal axis of the plurality of cells in a first direction from a cell first side to a cell second side, wherein the plurality of temperature control portions are configured to simultaneously receive a temperature control fluid such that the plurality of temperature control portions provide temperature control to the plurality of cells in parallel.

In certain exemplary embodiments the plurality of temperature control portions include curvilinear fluid passageways.

In certain exemplary embodiments the plurality of temperature control portions provide temperature control to the plurality of cells in parallel curvilinear paths.

In certain exemplary embodiments the temperature control mechanism is configured to provide substantially uniform temperature distribution between each of the plurality of cells.

In certain exemplary embodiments the temperature control mechanism is configured to substantially maintain a uniform and reduced pressure loss of the temperature control fluid while respectively traveling through each of the plurality of temperature control portions.

In certain exemplary embodiments each of the plurality of temperature control portions are formed integral to the temperature control mechanism.

In certain exemplary embodiments the temperature control fluid makes a first pass through the plurality of temperature control portions, respectively, along the longitudinal axis of the plurality of cells in the first direction from the cell first side to the cell second side, and a second pass through the plurality of temperature control portions, respectively, along the longitudinal axis of the plurality of cells in a second direction from the cell second side to the first cell first side, wherein the second direction is opposite the first direction.

In certain exemplary embodiments the electrical component includes a pack composed of batteries and supercapacitors.

In certain exemplary embodiments the electrical component includes a pack composed of at least one battery pack and at least one supercapacitor pack.

In certain exemplary embodiments the battery pack includes a first group of cells and a second group of cells, the temperature control mechanism includes a first side and a second side opposite the first side, the first side of the temperature control mechanism includes a first side first portion configured to receive positive poles of the first group of cells and a first side second portion configured to receive negative poles of the second group of cells, and the second side of the temperature control mechanism includes a second side first portion configured to receive negative poles of the first group of cells and a second side second portion configured to receive positive poles of the second group of cells.

In certain exemplary embodiments the electrical component includes a battery pack composed of cells in a series configuration, a parallel configuration, and/or in a parallel/series hybrid configuration.

In certain exemplary embodiments the temperature control mechanism includes a crash structure surrounding the plurality of cells.

In certain exemplary embodiments the temperature control fluid includes a cooling fluid.

In certain exemplary embodiments the temperature control fluid includes a heating fluid.

In certain exemplary embodiments the plurality of temperature control portions include curvilinear fins.

In certain exemplary embodiments the plurality of temperature control portions include curvilinear fluid passageways formed by curvilinear fins.

In certain exemplary embodiments the plurality of cells include a cylindrical, rectangular, square, or triangular shape.

In certain exemplary embodiments the temperature control mechanism includes a fluid inlet portion and a fluid outlet portion.

In certain exemplary embodiments the fluid inlet portion and the fluid outlet portion are orientated vertically.

In certain exemplary embodiments the fluid inlet portion and the fluid outlet portion are orientated horizontally.

In certain exemplary embodiments the temperature control mechanism includes more than one fluid inlet portion and more than one fluid outlet portion.

In certain exemplary embodiments the fluid inlet portions and the fluid outlet portions are orientated vertically or horizontally.

In another exemplary embodiment of the present disclosure, a temperature control mechanism for an electrical component having a plurality of cells each defining a longitudinal axis is provided. The temperature control mechanism includes a plurality of temperature control portions that respectively surround the plurality of cells, each of the plurality of temperature control portions including a first direction flow line respectively extending along the longitudinal axis of the plurality of cells in a first direction from a cell first side to a cell second side; an inlet portion in fluid communication with the plurality of temperature control portions; an outlet portion in fluid communication with the plurality of temperature control portions and the inlet portion; an inlet line fluidly connecting the inlet portion to each of the first direction flow lines; and an outlet line fluidly connecting each of the first direction flow lines to the outlet portion, wherein each of the first direction flow lines are configured to simultaneously receive a temperature control fluid from the inlet line such that the plurality of temperature control portions provide temperature control to the plurality of cells in parallel, and wherein the temperature control fluid travels through each of the first direction flow lines in the first direction to the outlet line and then to the outlet portion.

In certain exemplary embodiments the plurality of temperature control portions include curvilinear fluid passageways.

In certain exemplary embodiments the first direction flow lines include curvilinear portions.

In certain exemplary embodiments the first direction flow lines each have an inlet side in fluid communication with the inlet line and an outlet side in fluid communication with the outlet line.

In another exemplary embodiment of the present disclosure, a temperature control mechanism for an electrical component having a plurality of cells each defining a longitudinal axis is provided. The temperature control mechanism includes a plurality of temperature control portions that respectively surround the plurality of cells, each of the plurality of temperature control portions including a first direction flow line respectively extending along the longitudinal axis of the plurality of cells in a first direction from a cell first side to a cell second side and a second direction flow line respectively extending along the longitudinal axis of the plurality of cells in a second direction from the cell second side to the cell first side, wherein the second direction is opposite the first direction, and the second direction flow lines are respectively in fluid communication with the first direction flow lines; an inlet portion in fluid communication with the plurality of temperature control portions; an outlet portion in fluid communication with the plurality of temperature control portions and the inlet portion; an inlet line fluidly connecting the inlet portion to each of the first direction flow lines; and an outlet line fluidly connecting each of the second direction flow lines to the outlet portion, wherein each of the first direction flow lines are configured to simultaneously receive a temperature control fluid from the inlet line such that the plurality of temperature control portions provide temperature control to the plurality of cells in parallel, wherein, in a first pass, the temperature control fluid travels through each of the first direction flow lines in the first direction to the respective second direction flow lines, and wherein, in a second pass, the temperature control fluid travels through each of the second direction flow lines in the second direction to the outlet line and then to the outlet portion.

In certain exemplary embodiments the plurality of temperature control portions include curvilinear fluid passageways.

In certain exemplary embodiments the first direction flow lines and the second direction flow lines include curvilinear portions.

In certain exemplary embodiments the first direction flow lines each have a first direction inlet side and a first direction outlet side, the second direction flow lines each have a second direction inlet side and a second direction outlet side, and the first direction inlet side is in fluid communication with the inlet line, the first direction outlet side is in fluid communication with the second direction inlet side, and the second direction outlet side is in fluid communication with the outlet line.

In certain exemplary embodiments the first direction outlet side is in fluid communication with the second direction inlet side via a fluid line.

In another exemplary embodiment of the present disclosure, a temperature control mechanism for an electrical component having a first cell defining a longitudinal axis is provided. The temperature control mechanism includes a first temperature control portion that surrounds the first cell, the first temperature control portion defines a first temperature control portion first channel that extends, in a first pass, along the longitudinal axis of the first cell in a first direction from a first cell first side to a first cell second side; and the first temperature control portion defines a first temperature control portion second channel that extends, in a second pass, along the longitudinal axis of the first cell in a second direction from the first cell second side to the first cell first side, wherein the second direction is opposite the first direction.

In certain exemplary embodiments the temperature control mechanism is for an electrical component further having a second cell defining a second longitudinal axis. The temperature control mechanism further including a second temperature control portion that surrounds the second cell, the second temperature control portion defines a second temperature control portion first channel that extends, in a third pass, along the second longitudinal axis of the second cell in a third direction from a second cell first side to a second cell second side; and the second temperature control portion defines a second temperature control portion second channel that extends, in a fourth pass, along the second longitudinal axis of the second cell in a fourth direction from the second cell second side to the second cell first side, wherein the fourth direction is opposite the third direction.

In certain exemplary embodiments the first temperature control portion and the second temperature control portion include curvilinear portions.

In certain exemplary embodiments the temperature control mechanism is configured to provide substantially uniform temperature distribution between the first cell and the second cell.

In certain exemplary embodiments the temperature control mechanism is configured to substantially maintain a uniform and reduced pressure loss of the first temperature control fluid and the second temperature control fluid while traveling through the temperature control mechanism.

In certain exemplary embodiments the first temperature control portion and the second temperature control portion are formed integral to the temperature control mechanism.

In certain exemplary embodiments the first temperature control portion first channel and the second temperature control portion first channel are configured to simultaneously receive a temperature control fluid.

In certain exemplary embodiments the first temperature control portion second channel and the second temperature control portion second channel are configured to simultaneously receive the temperature control fluid.

In certain exemplary embodiments an inlet of the first temperature control portion first channel and an outlet of the first temperature control portion second channel are each located at a first side of the temperature control mechanism.

In certain exemplary embodiments the temperature control mechanism includes a first side and a second side opposite the first side, the first side of the temperature control mechanism includes a first side first portion configured to receive a positive pole of the first cell and a first side second portion configured to receive a negative pole of the second cell, and the second side of the temperature control mechanism includes a second side first portion configured to receive a negative pole of the first cell and a second side second portion configured to receive a positive pole of the second cell.

In certain exemplary embodiments the temperature control fluid includes a cooling fluid.

In certain exemplary embodiments the temperature control fluid includes a heating fluid.

In certain exemplary embodiments the electrical component includes a pack composed of batteries and supercapacitors.

In certain exemplary embodiments the electrical component includes a pack composed of at least one battery pack and at least one supercapacitor pack.

In certain exemplary embodiments the battery pack includes a first group of cells and a second group of cells, the temperature control mechanism includes a first side and a second side opposite the first side, the first side of the temperature control mechanism includes a first side first portion configured to receive positive poles of the first group of cells and a first side second portion configured to receive negative poles of the second group of cells, and the second side of the temperature control mechanism includes a second side first portion configured to receive negative poles of the first group of cells and a second side second portion configured to receive positive poles of the second group of cells.

In certain exemplary embodiments the electrical component includes a battery pack composed of cells in a series configuration, a parallel configuration, and/or in a parallel/series hybrid configuration.

In certain exemplary embodiments temperature control mechanism includes a crash structure surrounding the first temperature control portion, the second temperature control portion, the first cell, and the second cell.

In an exemplary aspect of the present disclosure, a method is provided for operating a temperature control mechanism for an electrical component. The method includes providing a first temperature control portion that surrounds a first cell, the first cell defining a longitudinal axis; flowing a first temperature control fluid through the first temperature control portion, in a first pass, along the longitudinal axis of the first cell in a first direction from a first cell first side to a first cell second side; and flowing the first temperature control fluid through the first temperature control portion, in a second pass, along the longitudinal axis of the first cell in a second direction from the first cell second side to the first cell first side, wherein the second direction is opposite the first direction.

In certain exemplary aspects the method includes providing a second temperature control portion that surrounds a second cell, the second cell defining a second longitudinal axis; flowing a second temperature control fluid through the second temperature control portion, in a third pass, along the second longitudinal axis of the second cell in a third direction from a second cell first side to a second cell second side; and flowing the second temperature control fluid through the second temperature control portion, in a fourth pass, along the second longitudinal axis of the second cell in a fourth direction from the second cell second side to the second cell first side, wherein the fourth direction is opposite the third direction.

In certain exemplary aspects the first temperature control portion and the second temperature control portion include curvilinear portions.

In certain exemplary aspects after flowing the first temperature control fluid through the first temperature control portion and flowing the second temperature control fluid through the second temperature control portion, the temperature control mechanism is configured to provide substantially uniform temperature distribution between the first cell and the second cell.

In certain exemplary aspects the temperature control mechanism is configured to substantially maintain a uniform and reduced pressure loss of the first temperature control fluid and the second temperature control fluid while traveling through the temperature control mechanism.

In certain exemplary aspects flowing the first temperature control fluid through the first temperature control portion, in the first pass, along the longitudinal axis of the first cell in the first direction from the first cell first side to the first cell second side occurs simultaneously with flowing the second temperature control fluid through the second temperature control portion, in the third pass, along the second longitudinal axis of the second cell in the third direction from the second cell first side to the second cell second side.

In certain exemplary aspects flowing the first temperature control fluid through the first temperature control portion, in the second pass, along the longitudinal axis of the first cell in the second direction from the first cell second side to the first cell first side occurs simultaneously with flowing the second temperature control fluid through the second temperature control portion, in the fourth pass, along the second longitudinal axis of the second cell in the fourth direction from the second cell second side to the second cell first side.

In certain exemplary aspects flowing the first temperature control fluid through the first temperature control portion, in the first pass, along the longitudinal axis of the first cell in the first direction from the first cell first side to the first cell second side includes flowing the first temperature control fluid through a first temperature control portion first channel; and wherein flowing the first temperature control fluid through the first temperature control portion, in the second pass, along the longitudinal axis of the first cell in the second direction from the first cell second side to the first cell first side includes flowing the first temperature control fluid through a first temperature control portion second channel.

In certain exemplary aspects flowing the second temperature control fluid through the second temperature control portion, in the third pass, along the second longitudinal axis of the second cell in the third direction from the second cell first side to the second cell second side includes flowing the second temperature control fluid through a second temperature control portion first channel; and wherein flowing the second temperature control fluid through the second temperature control portion, in the fourth pass, along the second longitudinal axis of the second cell in the fourth direction from the second cell second side to the second cell first side includes flowing the second temperature control fluid through a second temperature control portion second channel.

In certain exemplary aspects the first temperature control portion and the second temperature control portion are formed integral to the temperature control mechanism.

In certain exemplary aspects an inlet of the first temperature control portion first channel and an outlet of the first temperature control portion second channel are each located at a first side of the temperature control mechanism.

In certain exemplary aspects the first temperature control fluid and the second temperature control fluid include a cooling fluid.

In certain exemplary aspects the first temperature control fluid and the second temperature control fluid include a heating fluid.

In certain exemplary aspects the electrical component includes a pack composed of batteries and supercapacitors.

In certain exemplary aspects the electrical component includes a pack composed of at least one battery pack and at least one supercapacitor pack.

In certain exemplary aspects the battery pack includes a first group of cells and a second group of cells, the temperature control mechanism includes a first side and a second side opposite the first side, the first side of the temperature control mechanism includes a first side first portion configured to receive positive poles of the first group of cells and a first side second portion configured to receive negative poles of the second group of cells, and the second side of the temperature control mechanism includes a second side first portion configured to receive negative poles of the first group of cells and a second side second portion configured to receive positive poles of the second group of cells.

In another exemplary aspect of the present disclosure, a method is provided for operating a temperature control mechanism for an electrical component. The method includes providing a temperature control portion in communication with a first column of cells including a first cell and a second cell and a second column of cells including a third cell in staggered arrangement with the first cell and the second cell; flowing a temperature control fluid through the temperature control portion along a flow path between the first cell and the second cell; directing a first portion of the flow path of the temperature control fluid with the temperature control portion in a first direction between the first cell and the third cell; and directing a second portion of the flow path of the temperature control fluid with the temperature control portion in a second direction between the second cell and the third cell.

In certain exemplary aspects the first portion of the flow path and the second portion of the flow path provide a cross-flow of the temperature control fluid around the third cell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 16 is a cross-sectional view of a temperature control mechanism in communication with an electrical component having a collector plate and insulator in accordance with an exemplary embodiment of the present disclosure.

FIG. 17 is a top elevation view of a temperature control mechanism in communication with an electrical component having a collector plate and insulator in accordance with an exemplary embodiment of the present disclosure.

FIG. 18 is a top elevation view of a perforated insulator in accordance with an exemplary embodiment of the present disclosure.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1A:
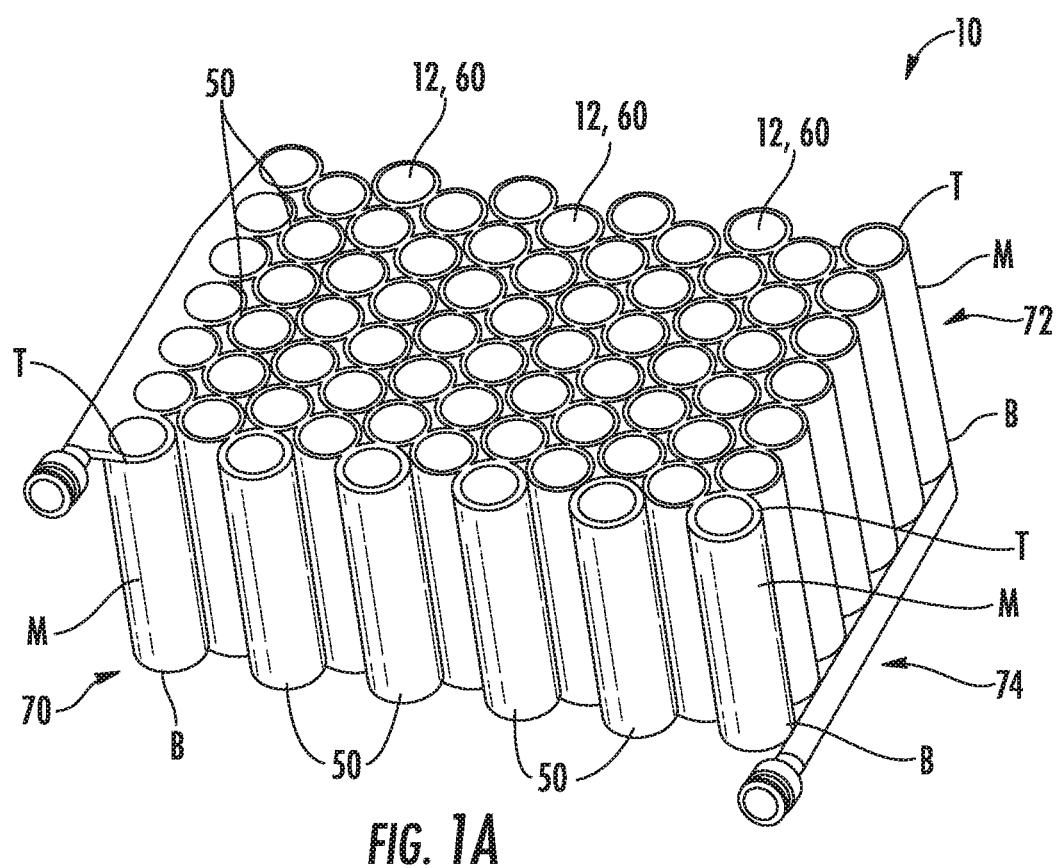
FIG. 1A is a perspective view of a temperature control mechanism in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A temperature control mechanism of the present disclosure advantageously is configured to provide substantially uniform temperature distribution between each of the plurality of cells of an electrical component. The temperature control portions and/or the passageways of a temperature control mechanism of the present disclosure may be straight, curvilinear, serpentine, helical, sinusoidal, or any other suitable shape. Conventional systems and conventional flow paths have a large cell-to-cell temperature variation across the systems where portions at an inlet have large temperature gradients from portions downstream of the inlet.

A temperature control mechanism of the present disclosure is also configured to substantially maintain a uniform and reduced pressure loss of a temperature control fluid while respectively traveling through temperature control portions of the temperature control mechanism. For example, a temperature control mechanism of the present disclosure is configured to substantially minimize pressure loss of a temperature control fluid while respectively traveling through temperature control portions of the temperature control mechanism. A temperature control mechanism of the present disclosure, by eliminating large pressure drops as a temperature control fluid travels through the temperature control mechanism, enables the use of higher flow rates of the temperature control fluid through the temperature control mechanism. A temperature control mechanism of the present disclosure, by providing a low pressure drop in the fluid system, enables less pumping energy required.

The plurality of temperature control portions of a temperature control mechanism of the present disclosure are configured to simultaneously receive a temperature control fluid such that the plurality of temperature control portions provide temperature control to all of the plurality of cells in parallel. In this manner, a temperature control mechanism of the present disclosure is configured to provide substantially uniform temperature distribution between each of the plurality of cells of an electrical component and the pressure loss and is configured to substantially maintain a uniform and reduced pressure loss of a temperature control fluid while respectively traveling through temperature control portions of the temperature control mechanism. Thus, the temperature distribution and the pressure loss in a temperature control mechanism of the present disclosure is significantly less than conventional systems having cooling in series, e.g., the cooling fluid traveling in a serpentine path between every other row of cells and only traveling over a portion of a lateral side of each cell.

A temperature control mechanism of the present disclosure provides much shorter flow paths for a working temperature control fluid resulting in better thermal control, more efficient cooling or heating, more uniform battery temperature throughout the entirety of the battery pack, reduced thermal gradients in the battery taking advantage of low pressure loss capability, and a lower pressure drop in the fluid system. This leads to a longer battery life and the charging/discharge rate is also improved.

A temperature control mechanism of the present disclosure advantageously provides for temperature control along a depth, or Z-axis, or longitudinal axis of an electrical component or other component requiring temperature uniformity. The longitudinal axis of the electrical component or cell can extend through a cell having straight, curvilinear, and/or any other suitable shaped portions. A temperature control mechanism of the present disclosure allows for temperature control over a larger surface area of an electrical component than conventional systems that only flow around a portion of an electrical component, e.g., only a portion of a cell that is perpendicular to its longitudinal axis such as only a portion of a lateral side of each battery cell will be exposed to coolant as described above. In this manner, a temperature control mechanism of the present disclosure provides improved temperature uniformity over the entirety of the electrical component and more ability to thermally control the electrical component. Furthermore, a temperature control mechanism of the present disclosure provides a single flow path or passageway for temperature control along a depth, or Z-axis, or longitudinal axis of each component of an electrical component, e.g., each cell, to surround the electrical component. The flow paths or passageways of a temperature control mechanism of the present disclosure may be straight, curvilinear, serpentine, helical, sinusoidal, or any other suitable shape.

A temperature control mechanism of the present disclosure provides for multiple temperature control options. In one exemplary embodiment, a temperature control mechanism of the present disclosure receives a cooling fluid to provide a cooling mechanism to a component. In this embodiment, temperature control portions of the temperature control mechanism receive a cooling fluid through its channels. In another exemplary embodiment, a temperature control mechanism of the present disclosure receives a heating fluid to provide a heating mechanism to a component. In this embodiment, temperature control portions of the temperature control mechanism receive a heating fluid through its channels.

A temperature control mechanism of the present disclosure also surrounds an electrical component, in the manner described herein, such that temperature control portions of the temperature control mechanism provide stability, rigidity, and protection to the electrical component. For example, temperature control portions of the temperature control mechanism of the present disclosure provide protection to an electrical component or other component in the event of a high impact event or crash.

Figure 1C:
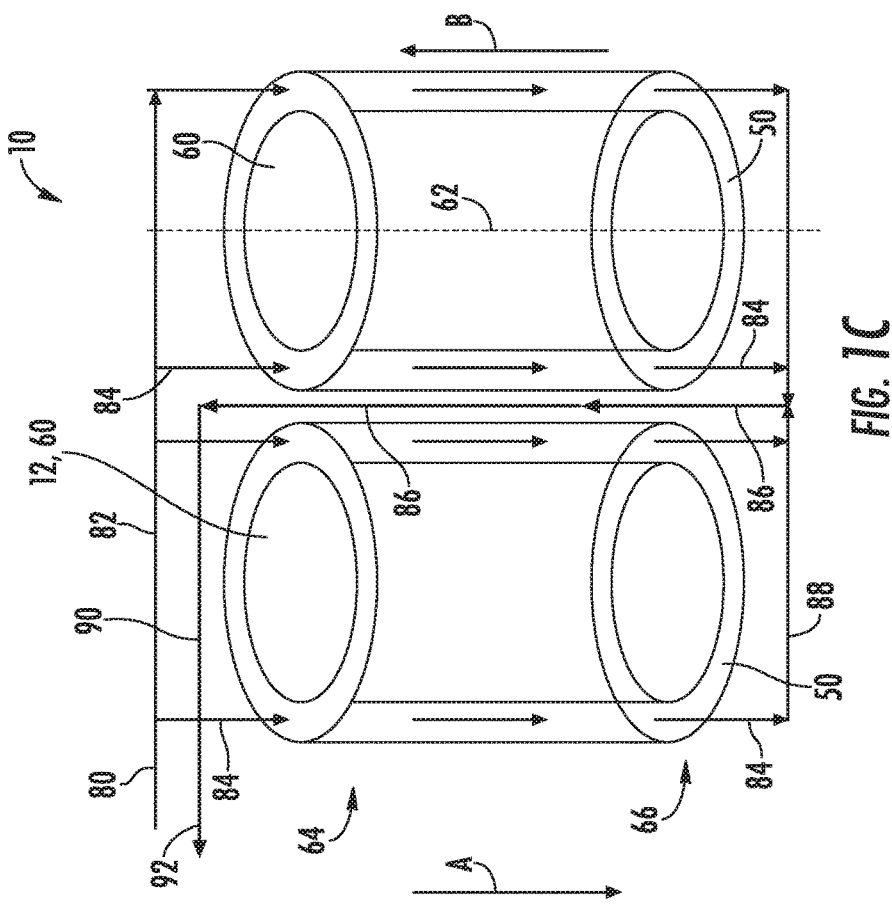
FIG. 1C is a perspective view of a temperature control mechanism extending over cells in accordance with another exemplary embodiment of the present disclosure.
Figure 1B:
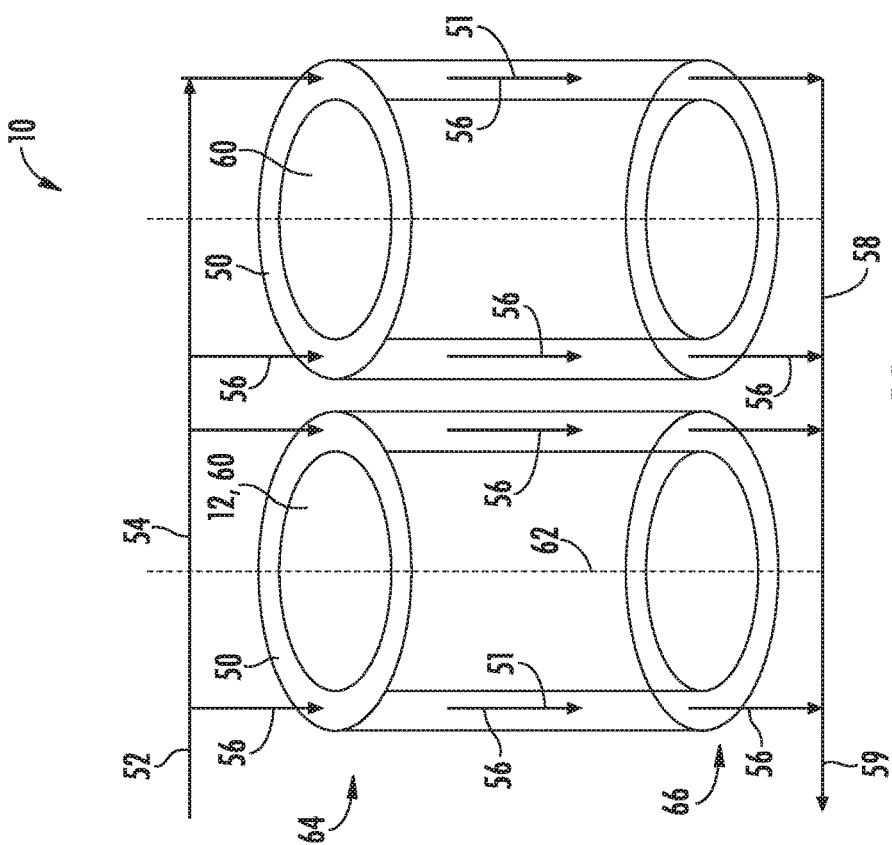
FIG. 1B is a perspective view of a temperature control mechanism extending over cells in accordance with an exemplary embodiment of the present disclosure.

Referring now to the drawings, wherein identical numerals indicate the same elements throughout the figures. Referring to FIGS. 1A-1C, in an exemplary embodiment, a temperature control mechanism 10 for an electrical component 12 includes a plurality of temperature control portions 50. The electrical component 12 includes a plurality of cells 60 each defining a longitudinal axis 62 (FIGS. 1B and 1C). Although the cells 60 are shown in FIGS. 1B-2B as cylindrical portions, it is contemplated that the cells or electrical component may have any regular or irregular shape having linear and/or curvilinear portions. Further, such cells having linear and/or curvilinear portions define a longitudinal axis 62 (FIGS. 1B and 1C). For example, a longitudinal axis 62 of the electrical component or cells can extend through cells having straight, curvilinear, and/or any other suitable shaped portions.

Referring to FIGS. 1A-1C, the plurality of temperature control portions 50 respectively surround the plurality of cells 60. Each of the plurality of temperature control portions 50 respectively extend along the longitudinal axis 62 of the plurality of cells 60 in a first direction generally along arrow A from a cell first side 64 to a cell second side 66. Each of the plurality of temperature control portions 50 may be straight, curvilinear, serpentine, helical, sinusoidal, or any other suitable shape.

As used herein, the term "surrounds" with respect to the temperature control portions 50 respectively surrounding the plurality of cells 60 refers to the temperature control portions 50 extending along a depth, or Z-axis, or longitudinal axis 62 of the plurality of cells 60. Furthermore, the temperature control portions 50 respectively surround the surface area of an electrical component, e.g., the plurality of cells 60, along the entirety of the longitudinal axis 62 of the plurality of cells 60. The temperature control portions 50 having portions that are straight, curvilinear, serpentine, helical, sinusoidal, or any other suitable shape can respectively surround the surface area of an electrical component, e.g., the plurality of cells 60. In this manner, the temperature control portions 50 of the present disclosure allow for temperature control over a larger surface area of an electrical component than conventional systems that only flow around a portion of an electrical component, e.g., only a portion of a cell that is perpendicular to its longitudinal axis such as only a portion of a lateral side of each battery cell will be exposed to coolant as described above. Furthermore, in one exemplary embodiment, a flow structure for a temperature control fluid through a temperature control portion of a temperature control mechanism of the present disclosure is separate and apart from a flow structure of other temperature control portions of the temperature control mechanism. In other words, each flow structure for each temperature control portion is separate and apart from a flow structure of other temperature control portions of the temperature control mechanism. This allows for each temperature control portion of a temperature control mechanism of the present disclosure to simultaneously receive a temperature control fluid.

Referring still to FIGS. 1A-1C, the plurality of temperature control portions 50 are configured to simultaneously receive a temperature control fluid 51 such that the plurality of temperature control portions 50 provide temperature control to all of the plurality of cells 60 in parallel.

Referring to FIG. 1B, in an exemplary embodiment, the temperature control mechanism 10 further includes an inlet portion 52, an inlet line 54, first direction flow lines or passageways 56, an outlet line 58, and an outlet portion 59. Referring to FIGS. 1A-1C, in one exemplary embodiment, the inlet portion 52 and the outlet portion 59 are shown as having a horizontal orientation. In other exemplary embodiments, the inlet portion 52 and the outlet portion 59 can have a vertical orientation. Referring to FIGS. 1A-1C, in one exemplary embodiment, the temperature control mechanism 10 includes one inlet portion 52 and one outlet portion 59. In other exemplary embodiments, the temperature control mechanism 10 includes more than one inlet portion 52 and more than one outlet portion 59 having any number of horizontal and/or vertical orientations to enable better flow distribution among a pack.

Each of the plurality of temperature control portions 50 include a first direction flow line or passageway 56 that respectively extend along the longitudinal axis 62 of the plurality of cells 60 in a first direction generally along arrow A from a cell first side 64 to a cell second side 66. Each of the passageways 56 of a temperature control mechanism 10 of the present disclosure may be straight, curvilinear, serpentine, helical, sinusoidal, or any other suitable shape. For example, each of the passageways of a temperature control mechanism of the present disclosure may include passageways described in U.S. Pat. No. 10,175,003, entitled "Additively Manufactured Heat Exchanger", and commonly assigned with the present application, the entire disclosure of which is hereby expressly incorporated herein by reference.

The inlet portion 52 is in fluid communication with the plurality of temperature control portions 50. The outlet portion 59 is in fluid communication with the plurality of temperature control portions 50 and the inlet portion 52.

The inlet line 54 fluidly connects the inlet portion 52 of the temperature control mechanism 10 to each of the first direction flow lines 56. The outlet line 58 fluidly connects each of the first direction flow lines 56 to the outlet portion 59.

Referring still to FIG. 1B, in one exemplary embodiment, a flow path of a temperature control fluid 51 through a temperature control mechanism 10 of the present disclosure will now be discussed. The temperature control mechanism 10 receives a temperature control fluid 51 through the inlet portion 52. The temperature control fluid 51 then travels through the inlet line 54. The inlet line 54 fluidly connects the inlet portion 52 of the temperature control mechanism 10 to each of the first direction flow lines or passageways 56. In this manner, each of the first direction flow lines or passageways 56 are configured to simultaneously receive a temperature control fluid 51 from the inlet line 54 such that the plurality of temperature control portions 50 provide temperature control to the plurality of cells 60 in parallel.

The temperature control fluid 51 travels through each of the first direction flow lines 56 in the first direction generally along arrow A from cell first side 64 to cell second side 66. Next, the temperature control fluid 51 travels out the first direction flow lines 56 to the outlet line 58 and then to the outlet portion 59. Referring to FIG. 1B, in one embodiment, the inlet portion 52 and the outlet portion 59 are located at opposite sides. As discussed above, the passageways of a temperature control mechanism of the present disclosure may be straight, curvilinear, serpentine, helical, sinusoidal, or any other suitable shape and a temperature control fluid may travel in accordingly linear or curvilinear flows paths along these passageways in a direction generally along arrow A from a cell first side to a cell second side.

The flow path of a temperature control fluid 51 through a temperature control mechanism 10 of the present disclosure allows for many advantages over conventional systems.

Referring to FIG. 1A, the temperature control mechanism 10 is configured to provide substantially uniform temperature distribution between each of the plurality of cells 60 by providing temperature control to all of the plurality of cells in parallel. For example, after flowing a temperature control fluid 51 in parallel through a temperature control mechanism 10 of the present disclosure as described above, the temperature distribution is substantially uniform across all of the cells 60. For example, referring to FIG. 1A, in one exemplary embodiment, the temperatures at top portion T, middle portion M, and bottom portion B of cells 60 at a first area 70, a second area 72, and a third area 74 would be substantially uniform across each other. Conventional systems and conventional flow paths have a large cell-to-cell temperature variation across the systems where portions at an inlet have large temperature gradients from portions downstream of the inlet.

A temperature control mechanism 10 of the present disclosure is also configured to substantially maintain a uniform and reduced pressure loss, e.g., minimize pressure loss, of a temperature control fluid 51 while respectively traveling through temperature control portions 50. For example, a temperature control mechanism 10 of the present disclosure is configured to substantially minimize pressure loss of a temperature control fluid 51 while respectively traveling through temperature control portions 50 of the temperature control mechanism 10. A temperature control mechanism 10 of the present disclosure, by eliminating large pressure drops as a temperature control fluid 51 travels through the temperature control mechanism 10, enables the use of higher flow rates of the temperature control fluid 51 through the temperature control mechanism 10. A temperature control mechanism 10 of the present disclosure, by providing a low pressure drop in the fluid system, enables less pumping energy required.

A temperature control mechanism 10 of the present disclosure provides much shorter flow paths for a working temperature control fluid resulting in better thermal control, more efficient cooling or heating, more uniform battery temperature throughout the entirety of the battery pack, reduced thermal gradients in the battery taking advantage of low pressure loss capability, and a lower pressure drop in the fluid system. This leads to a longer battery life and the charging/discharge rate is also improved.

Referring to FIG. 1A, in an exemplary embodiment, each of the plurality of temperature control portions 50 are formed integral to the temperature control mechanism 10. As shown in FIG. 1A, the temperature control portions 50 form a single integral structure, i.e., a single integral temperature control mechanism 10. As used herein, the term "integral" with respect to the temperature control portions 50 forming a single integral structure, i.e., a single integral temperature control mechanism 10, refers to each temperature control portion 50 being contained within a single housing or casing of the temperature control mechanism 10. In other words, each of the temperature control portions 50 are contained within a single integral temperature control mechanism 10 and each of the temperature control portions 50 are located at a position fixed relative to the outer casing of the integral temperature control mechanism 10. In this manner, the temperature control mechanism 10, having integral temperature control portions 50 therein, is distinguishable from two separate components, i.e., a first component having a first housing containing a first portion therein and a separate second component having a separate second housing containing a second portion therein. Each temperature control portion 50 of temperature control mechanism 10 is able to receive a separate portion of an electrical component or other component, e.g., a separate cell of a battery.

Referring to FIG. 1C, in an exemplary embodiment, the temperature control mechanism 10 further includes an inlet portion 80, an inlet line 82, first direction flow lines or passageways 84, second direction flow lines or passageways 86, a transfer or fluid line 88, an outlet line 90, and an outlet portion 92. Referring to FIGS. 1A-1C, in one exemplary embodiment, the inlet portion 80 and the outlet portion 92 are shown as having a horizontal orientation. In other exemplary embodiments, the inlet portion 80 and the outlet portion 92 can have a vertical orientation. Referring to FIGS. 1A-1C, in one exemplary embodiment, the temperature control mechanism 10 includes one inlet portion 80 and one outlet portion 92. In other exemplary embodiments, the temperature control mechanism 10 includes more than one inlet portion 80 and more than one outlet portion 92 having any number of horizontal and/or vertical orientations to enable better flow distribution among a pack.

Each of the plurality of temperature control portions 50 include a first direction flow line or passageway 84 that respectively extend along the longitudinal axis 62 of the plurality of cells 60 in a first direction generally along arrow A from a cell first side 64 to a cell second side 66. Temperature control portions 50 may also include a second direction flow line or passageway 86 that respectively extend along the longitudinal axis 62 of the plurality of cells 60 in a second direction generally along arrow B from the cell second side 66 to the cell first side 64. In one embodiment, the second direction generally along arrow B is opposite the first direction generally along arrow A, as shown in FIG. 1C. As described above, each of the passageways 84, 86 of a temperature control mechanism 10 of the present disclosure may be straight, curvilinear, serpentine, helical, sinusoidal, or any other suitable shape. The second direction flow lines 86 are respectively in fluid communication with the first direction flow lines 84. In one embodiment, the second direction flow lines 86 are respectively in fluid communication with the first direction flow lines 84 via the transfer or fluid line 88. In an exemplary embodiment, each of the plurality of temperature control portions 50 include a second direction flow line 86. In another exemplary embodiment, a second direction flow line 86 is located between adjacent temperature control portions 50 as shown in FIG. 1C.

The inlet portion 80 is in fluid communication with the plurality of temperature control portions 50. The outlet portion 92 is in fluid communication with the plurality of temperature control portions 50 and the inlet portion 80. The inlet line 82 fluidly connects the inlet portion 80 to each of the first direction flow lines 84. The outlet line 90 fluidly connects each of the second direction flow lines 86 to the outlet portion 92.

Referring still to FIG. 1C, a flow path of a temperature control fluid 51 through a temperature control mechanism 10 of the present disclosure will now be discussed. The temperature control mechanism 10 receives a temperature control fluid 51 through the inlet portion 80. The temperature control fluid 51 then travels through the inlet line 82. The inlet line 82 fluidly connects the inlet portion 80 of the temperature control mechanism 10 to each of the first direction flow lines 84. In this manner, each of the first direction flow lines 84 are configured to simultaneously receive a temperature control fluid 51 from the inlet line 82 such that the plurality of temperature control portions 50 provide temperature control to the plurality of cells 60 in parallel.

The temperature control fluid 51 travels through each of the first direction flow lines or passageways 84 in the first direction generally along arrow A from cell first side 64 to cell second side 66. Next, the temperature control fluid 51 travels out the first direction flow lines 84 to the second direction flow lines 86 respectively. As discussed above, the passageways of a temperature control mechanism of the present disclosure may be straight, curvilinear, serpentine, helical, sinusoidal, or any other suitable shape and a temperature control fluid may travel in accordingly linear or curvilinear flows paths along these passageways in a direction generally along arrow A from a cell first side to a cell second side.

In one embodiment, the temperature control fluid 51 travels out the first direction flow lines or passageways 84 to the second direction flow lines or passageways 86, respectively, via the transfer or fluid line 88. Next, the temperature control fluid 51 travels through each of the second direction flow lines or passageways 86 in the second direction generally along arrow B from cell second side 66 to the cell first side 64. In one embodiment, the second direction generally along arrow B is opposite the first direction generally along arrow A, as shown in FIG. 1C. The temperature control mechanism 10 having first direction flow lines 84 and second direction flow lines 86 allows for a temperature control fluid 51 to make two separate passes over the entirety of the longitudinal axis 62 of each of the plurality of cells 60. As discussed above, the passageways of a temperature control mechanism of the present disclosure may be straight, curvilinear, serpentine, helical, sinusoidal, or any other suitable shape and a temperature control fluid may travel in accordingly linear or curvilinear flows paths along these passageways in a direction generally along arrow B from a cell second side to a cell first side.

The temperature control fluid 51 travels out the second direction flow lines 86 to the outlet line 90 and then to the outlet portion 92. Referring to FIG. 1C, in one embodiment, the inlet portion 80 and the outlet portion 92 are each located at the same side.

Figure 2A:
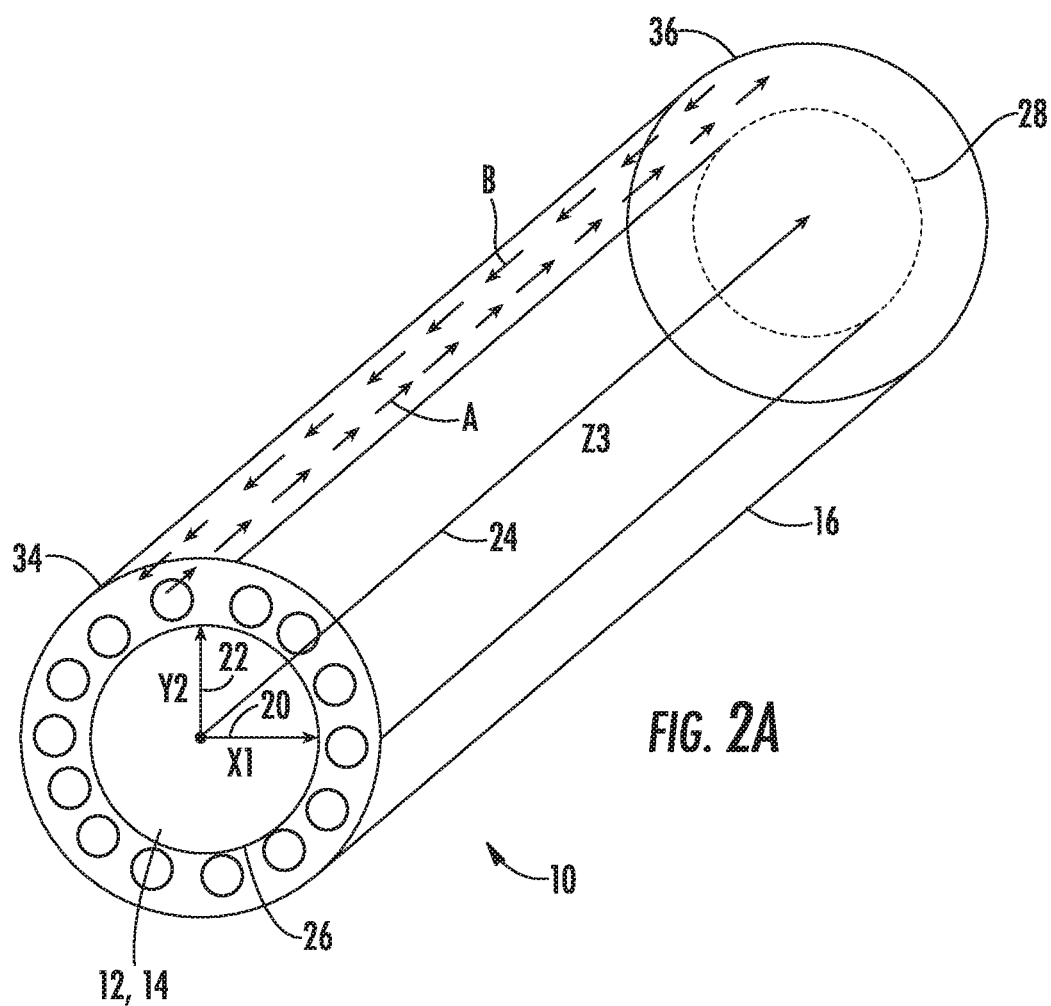
FIG. 2A is a perspective view of a temperature control mechanism extending over a cell in accordance with an exemplary embodiment of the present disclosure.

Referring to FIG. 2A, in an exemplary embodiment, a temperature control mechanism 10 for an electrical component 12 includes a first cell 14 and a first temperature control portion 16. In an exemplary embodiment, the first cell 14 is a part of the electrical component 12. In an exemplary embodiment, the temperature control portion 16 is a part of the temperature control mechanism 10 for providing thermal control to the electrical component 12. A temperature control portion 16 of the present disclosure can include portions that may be straight, curvilinear, serpentine, helical, sinusoidal, or any other suitable shape.

Referring to FIG. 2A, the first cell 14 includes a first portion 20 extending along a first axis X1, a second portion 22 extending along a second axis Y2, and a third portion 24 extending along a third axis or longitudinal axis Z3. Referring to FIG. 2A, the first axis X1 is perpendicular to the second axis Y2, the third axis Z3 is perpendicular to the first axis X1, and the third axis Z3 is perpendicular to the second axis Y2.

The third portion 24 of the first cell 14 extends along the third axis Z3 from a first cell first side 26 to a first cell second side 28. In one embodiment, the first cell 14 has a cylindrical shape. It is contemplated that the first cell 14 may include any shape. For example, the first cell 14 may also have a rectangular, square, triangular, or any other geometrical shape for a desired application.

Referring to FIG. 2A, in an exemplary embodiment, the first temperature control portion 16 surrounds the first cell 14. As discussed above and as used herein, the term "surrounds" with respect to the temperature control portion 16 surrounding the first cell 14 refers to the temperature control portion 16 extending along a depth, or Z-axis, or longitudinal axis of an electrical component or other component. Furthermore, the temperature control portion 16 surrounds the surface area of an electrical component, e.g., the first cell 14, along the entirety of a longitudinal axis of the electrical component. The temperature control portion 16 having portions that are straight, curvilinear, serpentine, helical, sinusoidal, or any other suitable shape can respectively surround the surface area of an electrical component, e.g., a cell 14. In this manner, a temperature control portion 16 of the present disclosure allows for temperature control over a larger surface area of an electrical component than conventional systems that only flow around a portion of an electrical component, e.g., only a portion of a cell that is perpendicular to its longitudinal axis such as only a portion of a lateral side of each battery cell will be exposed to coolant as described above.

Referring still to FIG. 2A, in an exemplary embodiment, the first temperature control portion 16 extends, in a first pass, along the third axis or longitudinal axis Z3 of the third portion 24 of the first cell 14 in a first direction generally along arrow A from first cell first side 26 to first cell second side 28. In one embodiment, the first temperature control portion 16 has a cylindrical shape. It is contemplated that the first temperature control portion 16 may include any shape. For example, the first temperature control portion 16 may also have a rectangular, square, triangular, or any other geometrical shape for a desired application.

Figure 3:
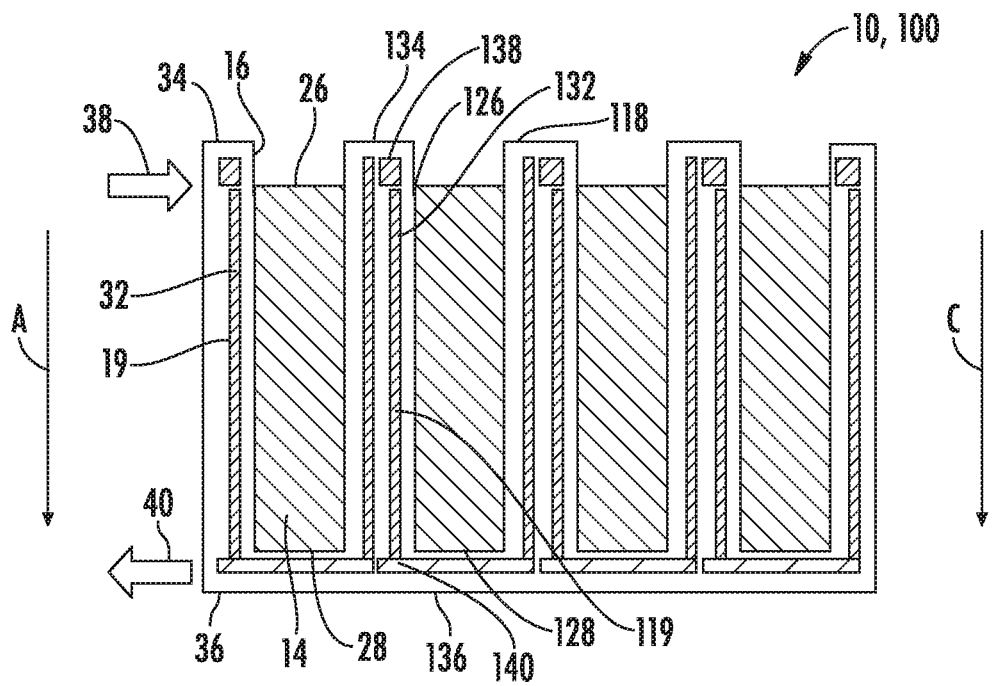
FIG. 3 is a cross-sectional view of a temperature control mechanism extending over each cell of an electrical component in accordance with an exemplary embodiment of the present disclosure.

Referring to FIG. 3, in an exemplary embodiment of the present disclosure, the first temperature control portion 16 includes a first temperature control portion first channel or passageway 32 extending along the first pass in the first direction generally along arrow A from first cell first side 26 to first cell second side 28. The first temperature control portion 16 includes a first side 34 and an opposite second side 36. In such a configuration, a first temperature control fluid 19 enters the temperature control mechanism 10 at an inlet portion 38 of first temperature control portion first channel 32 at the first side 34, travels through the first temperature control portion first channel 32 along the third axis Z3 of the third portion 24 of the first cell 14 in a first direction generally along arrow A, and exits the temperature control mechanism 10 at an outlet portion 40 of first temperature control portion first channel 32 at the second side 36. A channel or passageway 32 of a temperature control portion 16 of the present disclosure may be straight, curvilinear, serpentine, helical, sinusoidal, or any other suitable shape.

Referring back to FIG. 2A, in another exemplary embodiment, the first temperature control portion 16 extends, in a second pass, along the third axis or longitudinal axis Z3 of the third portion 24 of the first cell 14 in a second direction generally along arrow B from first cell second side 28 to first cell first side 26. In one embodiment, the second direction generally along arrow B is opposite the first direction generally along arrow A, as shown in FIG. 2A.

In this manner, a temperature control mechanism 10 of the present disclosure provides an additional flow path over the first cell 14 for further temperature control along a depth, or Z-axis, or longitudinal axis of an electrical component or other component requiring temperature uniformity. This allows the temperature control mechanism 10 of the present disclosure to provide an additional flow path over the first cell 14 to further improve temperature uniformity over the entirety of the electrical component and provides more ability to thermally control the electrical component.

Figure 4:
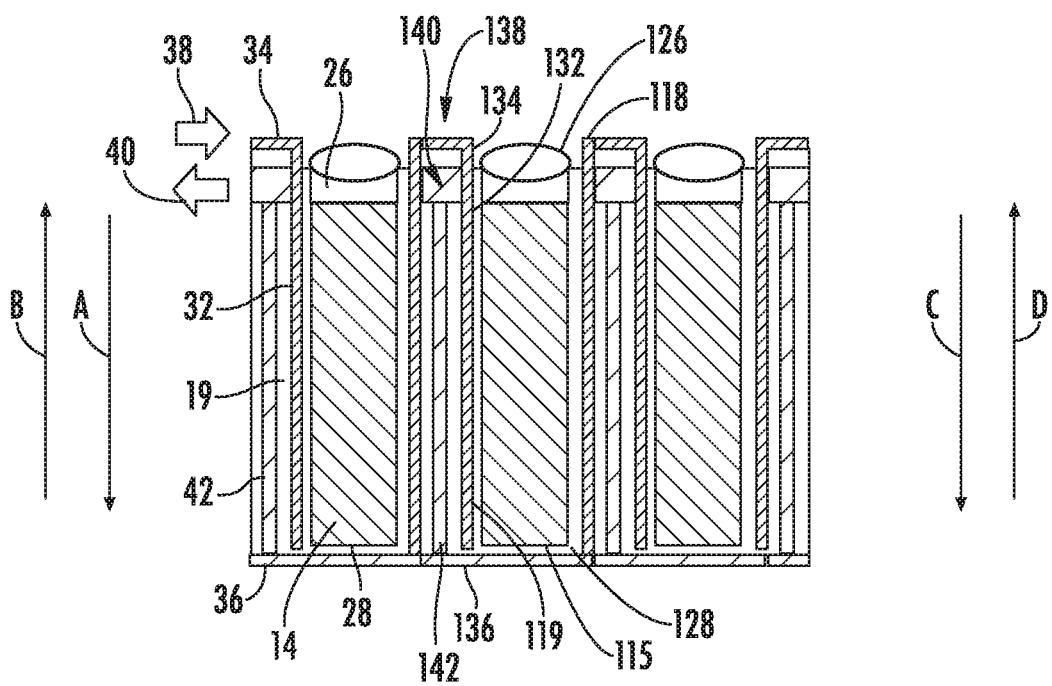
FIG. 4 is a cross-sectional view of a temperature control mechanism extending over each cell of an electrical component in accordance with another exemplary embodiment of the present disclosure.

Referring to FIG. 4, in an exemplary embodiment of the present disclosure, the first temperature control portion 16 includes a first temperature control portion second channel or passageway 42 extending along the second pass in the second direction generally along arrow B from first cell second side 28 to first cell first side 26. A channel or passageway 42 of a temperature control portion 16 of the present disclosure may be straight, curvilinear, serpentine, helical, sinusoidal, or any other suitable shape.

In this configuration, referring still to FIG. 4, after a first temperature control fluid 19 travels through the first temperature control portion first channel 32 in the first direction generally along arrow A, e.g., the fluid 19 can travel in a direction generally along arrow A that includes linear and/or curvilinear portions, the first temperature control fluid 19 then makes a second pass over the first cell 14 by entering the first temperature control portion second channel 42 at second side 36 and then traveling in a second direction generally along arrow B, e.g., the fluid 19 can travel in a direction generally along arrow B that includes linear and/or curvilinear portions, from first cell second side 28 to first cell first side 26. In other words, a first temperature control fluid 19 enters an inlet portion 38 of the temperature control mechanism 10 at the first side 34, travels through the first temperature control portion first channel 32 in a first direction generally along arrow A to the second side 36, enters first temperature control portion second channel 42 at the second side 36, and then travels through the first temperature control portion second channel 42 in a second direction generally along arrow B which is opposite to the first direction generally along arrow A, and exits an outlet portion 40 of the temperature control mechanism 10 at the first side 34. In this embodiment, the first temperature control fluid 19 enters and exits at the first side 34 after making two separate passes over the entirety of the longitudinal axis of the first cell 14. In one embodiment, the inlet portion 38 of the first temperature control portion first channel 32 and the outlet portion 40 of the first temperature control portion second channel 42 are each located at a first side 34 of the temperature control mechanism 10.

Referring still to FIG. 4, in an exemplary embodiment, each temperature control portion of temperature control mechanism 10 includes first and second channels or passageways 32, 42 to allow for a temperature control fluid to make two separate passes over the entirety of a longitudinal axis of each cell of an electrical component. As described above, these channels or passageways 32, 42 may be straight, curvilinear, serpentine, helical, sinusoidal, or any other suitable shape.

Figure 2B:
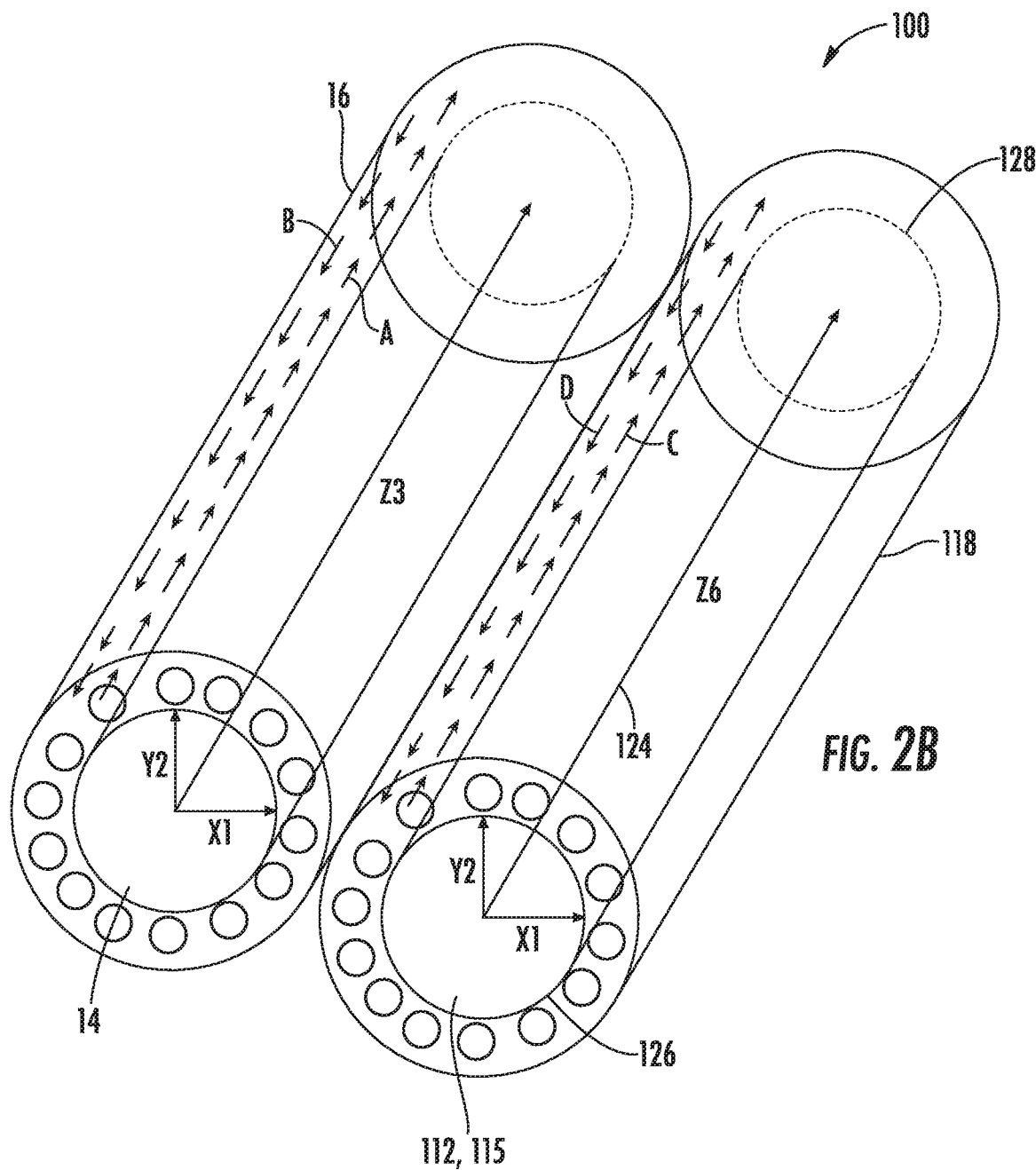
FIG. 2B is a perspective view of a temperature control mechanism having a first temperature control portion extending over a first cell and a second temperature control portion extending over a second cell in accordance with an exemplary embodiment of the present disclosure.

Referring to FIG. 2B, in an exemplary embodiment, a temperature control mechanism 100 for an electrical component 112 also includes a second cell 115 and a second temperature control portion 118. The exemplary embodiment illustrated in FIG. 2B includes a first cell 14 and a first temperature control portion 16 as described above with respect to FIG. 2A. For the sake of brevity, these similar components and the similar steps of using first temperature control portion 16 (FIG. 2A) to provide thermal control to first cell 14 (FIG. 2A) will not all be discussed in conjunction with the embodiment illustrated in FIG. 2B. In an exemplary embodiment, the first cell 14 and the second cell 115 form a part of the electrical component 112. In an exemplary embodiment, the first temperature control portion 16 and the second temperature control portion 118 form the temperature control mechanism 100 for providing thermal control to the electrical component 112.

Referring to FIG. 2B, in an exemplary embodiment, the second cell 115 includes a fourth portion 120 extending along a fourth axis X4, a fifth portion 122 extending along a fifth axis Y5, and a sixth portion 124 extending along a sixth axis or longitudinal axis Z6. Referring to FIG. 2B, the fourth axis X4 is perpendicular to the fifth axis Y5, the sixth axis Z6 is perpendicular to the fourth axis X4, and the sixth axis Z6 is perpendicular to the fifth axis Y5.

The sixth portion 124 of the second cell 115 extends along the sixth axis Z6 from a second cell first side 126 to a second cell second side 128. In one embodiment, the second cell 115 has a cylindrical shape. It is contemplated that the second cell 115 may include any shape. For example, the second cell 115 may also have a rectangular, square, triangular, or any other geometrical shape for a desired application.

Referring to FIG. 2B, in an exemplary embodiment, the second temperature control portion 118 surrounds the second cell 115. Referring still to FIG. 2B, the second temperature control portion 118 extends, in a third pass, along the sixth axis or longitudinal axis Z6 of the sixth portion 124 of the second cell 115 in a third direction generally along arrow C from a second cell first side 126 to a second cell second side 128. A temperature control portion 118 having portions that are straight, curvilinear, serpentine, helical, sinusoidal, or any other suitable shape can respectively surround the surface area of an electrical component, e.g., a cell 115.

Referring to FIG. 3, in an exemplary embodiment of the present disclosure, the second temperature control portion 118 includes a second temperature control portion first channel or passageway 132 extending along the third pass in the third direction generally along arrow C from second cell first side 126 to second cell second side 128. The second temperature control portion 118 includes a first side 134 and an opposite second side 136. In such a configuration, a second temperature control fluid 119 enters the temperature control mechanism 100 at an inlet portion 138 of second temperature control portion first channel 132 at the first side 134, travels through the second temperature control portion first channel 132 along the sixth axis Z6 of the sixth portion 124 of the second cell 115 in a third direction generally along arrow C, and exits the temperature control mechanism 100 at an outlet portion 140 of second temperature control portion first channel 132 at the second side 136. A channel or passageway 132 of a temperature control portion 118 of the present disclosure may be straight, curvilinear, serpentine, helical, sinusoidal, or any other suitable shape.

Referring to FIG. 2B, in another exemplary embodiment, the second temperature control portion 118 extends, in a fourth pass, along the sixth axis Z6 of the sixth portion 124 of the second cell 115 in a fourth direction generally along arrow D from the second cell second side 128 to the second cell first side 126. In one embodiment, the fourth direction generally along arrow D is opposite the third direction generally along arrow C, as shown in FIG. 2B. In this manner, a temperature control mechanism 100 of the present disclosure provides an additional flow path over the second cell 115 for further temperature control along a depth, or Z-axis, or longitudinal axis of an electrical component or other component requiring temperature uniformity, as described above.

Referring to FIG. 4, in an exemplary embodiment of the present disclosure, the second temperature control portion 118 includes a second temperature control portion second channel or passageway 142 extending along the fourth pass in the fourth direction generally along arrow D from second cell second side 128 to the second cell first side 126. A channel or passageway 142 of a temperature control portion 118 of the present disclosure may be straight, curvilinear, serpentine, helical, sinusoidal, or any other suitable shape.

In this configuration, referring still to FIG. 4, after a second temperature control fluid 119 travels through the second temperature control portion first channel 132 in the third direction generally along arrow C, e.g., the fluid 119 can travel in a direction generally along arrow C that includes linear and/or curvilinear portions, the second temperature control fluid 119 then makes a fourth pass over the second cell 115 by entering the second temperature control portion second channel 142 at second side 136 and then traveling in a fourth direction generally along arrow D, e.g., the fluid 19 can travel in a direction generally along arrow D that includes linear and/or curvilinear portions, from second cell second side 128 to second cell first side 126. In other words, a second temperature control fluid 119 enters an inlet portion 138 of the temperature control mechanism 100 at the first side 134, travels through the second temperature control portion first channel 132 in a third direction generally along arrow C to the second side 136, enters the second temperature control portion second channel 142 at the second side 136, and then travels through the second temperature control portion second channel 142 in a fourth direction generally along arrow D which is opposite to the third direction generally along arrow C, and exits an outlet portion 140 of the temperature control mechanism 100 at the first side 134. In this embodiment, the second temperature control fluid 119 enters and exits at the first side 134 after making two separate passes over the entirety of the longitudinal axis of the second cell 115. In one embodiment, the inlet portion 138 of the second temperature control portion first channel 132 and the outlet portion 140 of the second temperature control portion second channel 142 are each located at a first side 134 of the temperature control mechanism 100.

Referring to FIGS. 2A and 2B, in one exemplary embodiment, the first axis X1 and the fourth axis X4 define a horizontal axis, the second axis Y2 and the fifth axis Y5 define a vertical axis, and the third axis Z3 and the sixth axis Z6 define a depth axis or longitudinal axis. In other words, a temperature control mechanism 10, 100 of the present disclosure advantageously provides for temperature control along a depth, or Z-axis, or longitudinal axis of an electrical component 12, 112 or other component requiring temperature uniformity. The temperature control portions of temperature control mechanisms 10, 100 having portions that are straight, curvilinear, serpentine, helical, sinusoidal, or any other suitable shape can provide for temperature control along a depth, or Z-axis, or longitudinal axis of an electrical component 12, 112. A temperature control mechanism 10, 100 of the present disclosure allows for temperature control over a larger surface area of an electrical component 12, 112 than conventional systems that only flow around a portion of an electrical component, e.g., only a portion of a cell that is perpendicular to its longitudinal axis such as only a portion of a lateral side of each battery cell will be exposed to coolant as described above. In this manner, a temperature control mechanism 10, 100 of the present disclosure provides improved temperature uniformity over the entirety of the electrical component 12, 112 and more ability to thermally control the electrical component 12, 112.

A temperature control mechanism of the present disclosure provides for multiple temperature control options as described above. In one exemplary embodiment, the temperature control mechanism 10, 100 (FIGS. 1A-4) receives a cooling fluid to provide a cooling mechanism to a component. In this embodiment, the temperature control portions 16, 50, 118 of the temperature control mechanism 10, 100 receive a cooling fluid through the temperature control portions 16, 50, 118.

In another exemplary embodiment, a temperature control mechanism 10, 100 (FIGS. 1A-4) receives a heating fluid to provide a heating mechanism to a component. In this embodiment, the temperature control portions 16, 50, 118 of the temperature control mechanism 10, 100 receive a heating fluid through the temperature control portions 16, 50, 118.

A temperature control mechanism 10, 100 of the present disclosure can be used to control the temperature of a variety of electrical components. For example, in one embodiment, a temperature control mechanism 10, 100 of the present disclosure can be used to control the temperature of a battery pack or module. In other embodiments, a temperature control mechanism 10, 100 of the present disclosure can be used to control the temperature of other components, e.g., a pack or module composed of batteries and supercapacitors. In other embodiments, a temperature control mechanism 10, 100 of the present disclosure can be used to control the temperature of other components, e.g., a pack or module composed of at least one battery pack and at least one supercapacitor pack, or any other electrical component configuration. Any temperature control mechanism of the present disclosure is compatible with a battery pack comprised of a multitude of modules. Each module may be composed of a multitude of bricks. Each brick can be composed of a multitude of cells. A cell can be a battery cell or a supercapacitor cell. A brick can be exclusively composed of battery cells or supercapacitor cells. Cells within a brick can be all in parallel, or all in series, and/or in a hybrid configuration, e.g., parallel/series. Parallel, series, or hybrid may include electrical or hydraulic configurations. A module can have all bricks in parallel, or all in series, and/or in a hybrid configuration, e.g., parallel/series. A battery pack can have all modules in parallel, or all in series, and/or in a hybrid configuration, e.g., parallel/series. Battery cells and supercapacitor cells may have different dimensions within one brick, or from brick to brick, or from module to module. A brick can have one or more cells. A brick can include one or more rows or cells (N=1 or M=1, FIG. 21). A brick can include electrical grounding capability.

Figure 6:
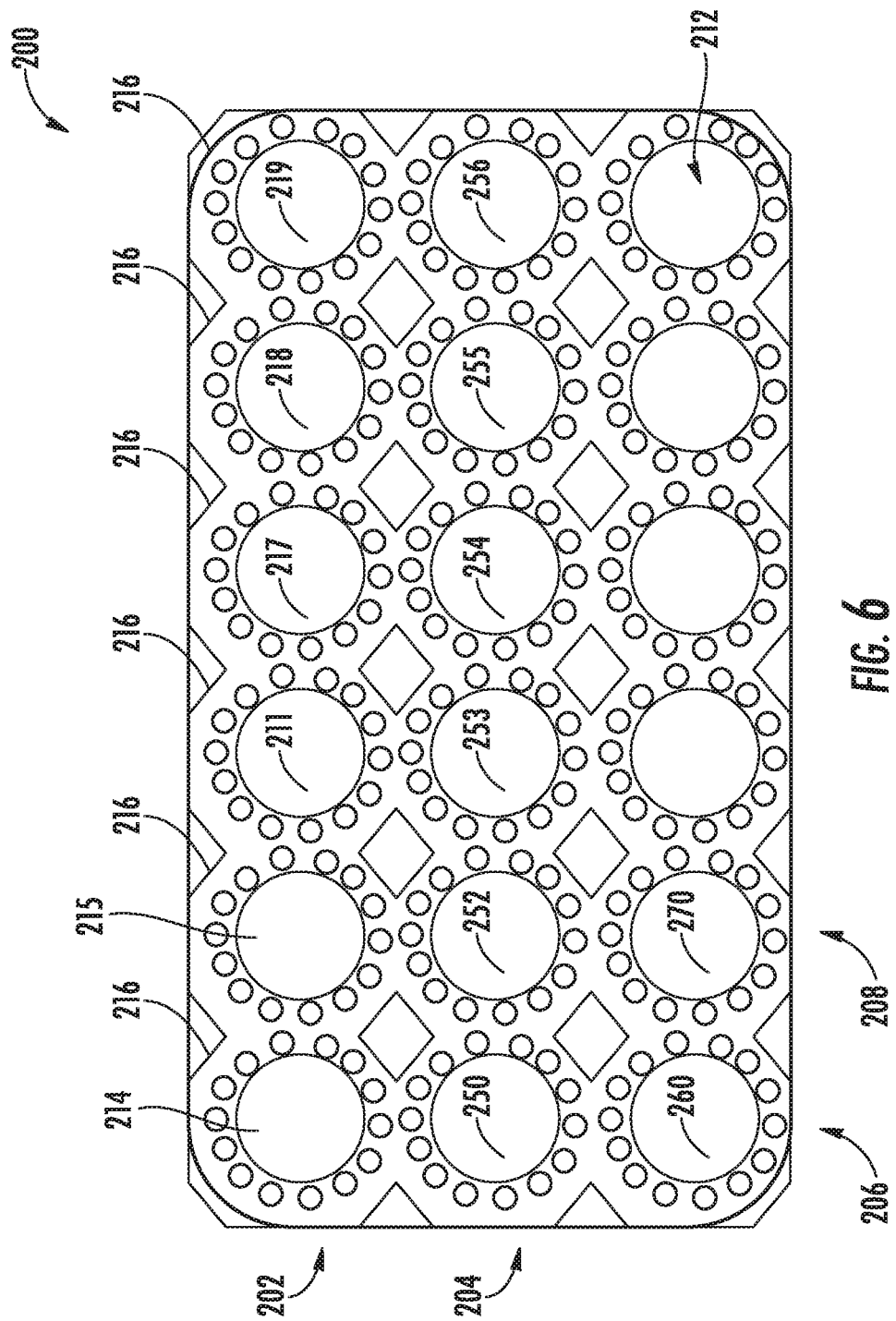
FIG. 6 is an elevation view of a temperature control mechanism surrounding rows and columns of cells in accordance with an exemplary embodiment of the present disclosure.

Referring to FIG. 6, in an exemplary embodiment, a temperature control mechanism 200 for an electrical component 212 includes a first row of cells 202, a second row of cells 204, a first column of cells 206, a second column of cells 208, and a plurality of temperature control portions 216. The embodiment illustrated in FIG. 6 includes a temperature control mechanism 200 and temperature control portions 216 that can function similarly to the temperature control mechanism and temperature control portions described in detail above with respect to FIGS. 1A-1C.

In an exemplary embodiment, the first row of cells 202, the second row of cells 204, the first column of cells 206, and the second column of cells 208 form a part of the electrical component 212. In an exemplary embodiment, the temperature control portions 216 form the temperature control mechanism 200 for providing thermal control to the electrical component 212.

Referring still to FIG. 6, in an exemplary embodiment, the first row of cells 202 includes at least a first cell 214 and a second cell 215. In other embodiments, any number of cells could be contained in the first row of cells 202. For example, the first row of cells 202 may also include a third cell 211, a fourth cell 217, a fifth cell 218, and a sixth cell 219. It is contemplated that any number of cells may be contained within the first row of cells 202. It is further contemplated that the electrical component 212 may include any number of rows.

In one embodiment, the first cell 214 corresponds to the first cell 14 as described above with respect to FIGS. 2A and 2B. In one embodiment, the second cell 215 corresponds to the second cell 115 as described above with respect to FIG. 2B.

As described with respect to FIG. 2A, the first cell 14, 214 includes a first portion 20 extending along a first axis X1, a second portion 22 extending along a second axis Y2, and a third portion 24 extending along a third axis Z3. Referring to FIG. 2A, the first axis X1 is perpendicular to the second axis Y2, the third axis Z3 is perpendicular to the first axis X1, and the third axis Z3 is perpendicular to the second axis Y2.

Referring still to FIG. 6, in an exemplary embodiment, the second row of cells 204 includes a second row first cell or third cell 250 and a second row second cell or a fourth cell 252. In other embodiments, any number of cells could be contained in the second row of cells 204. For example, the second row of cells 204 may also include a third cell 253, a fourth cell 254, a fifth cell 255, and a sixth cell 256. It is contemplated that any number of cells may be contained within the second row of cells 204.

Referring still to FIG. 6, in an exemplary embodiment, the first column of cells 206 includes the first cell 214 of the first row 202 and the second row first cell or third cell 250 of the second row 204. In other embodiments, any number of cells could be contained in the first column of cells 206. For example, the first column of cells 206 may also include a third cell 260. It is contemplated that any number of cells may be contained within the first column of cells 206.

Referring still to FIG. 6, in an exemplary embodiment, the second column of cells 208 includes the second cell 215 of the first row 202 and the second row second cell or fourth cell 252 of the second row 204. In other embodiments, any number of cells could be contained in the second column of cells 208. For example, the second column of cells 208 may also include a third cell 270. It is contemplated that any number of cells may be contained within the second column of cells 208.

Referring to FIG. 6, in an exemplary embodiment, the temperature control portions 216 of the temperature control mechanism 200 provide thermal control to an electrical component 212. In one embodiment, the temperature control portions 216 correspond to the temperature control portions 50 as described above with respect to FIGS. 1A-1C. In one embodiment, the temperature control portions 216 correspond to the temperature control portion 16 as described above with respect to FIG. 2A. In one embodiment, the temperature control portions 216 correspond to the temperature control portions 16, 118 as described above with respect to FIG. 2B.

Referring to FIG. 6, in an exemplary embodiment, temperature control portion 216 is disposed between the first row of cells 202 and the second row of cells 204, and temperature control portion 216 is disposed between the first column of cells 206 and the second column of cells 208.

Furthermore, the temperature control portion 216 provides each cell with temperature control along a depth or Z-axis of an electrical component as described above with respect to the temperature control portions of FIGS. 1A-4. Referring to FIG. 2A, for example, as described above, the temperature control portion 16, 216 extends, in a first pass, along the third axis Z3 of the third portion 24 of a first cell 14, 214 in a first direction generally along arrow A from first cell first side 26 to first cell second side 28. Referring still to FIG. 2A, the temperature control portion 16, 216 may also extend, in a second pass, along the third axis Z3 of the third portion 24 of the first cell 14, 214 in a second direction generally along arrow B from first cell second side 28 to first cell first side 26. In one embodiment, the second direction generally along arrow B is opposite the first direction generally along arrow A, as shown in FIG. 2A. The temperature control portion 216 of the present disclosure is able to provide each cell shown in FIG. 6 with temperature control along a depth or Z-axis with a single pass or a double pass, as described in more detail above with respect to FIGS. 2A and 2B.

Referring to FIG. 6, the temperature control portion 216 surrounds the first cell 214, the temperature control portion 216 surrounds the second cell 215, the temperature control portion 216 surrounds the third cell 250, and the temperature control portion 216 surrounds the fourth cell 252. The temperature control portion 216 of temperature control mechanism 200 surrounds every cell of an electrical component 212 as configured for a particular application.

As described above and as used herein, the term "surrounds" with respect to the temperature control portion 16, 50, 216 surrounding the cells refers to the temperature control portions 16, 50, 216 extending along a depth, or Z-axis, or longitudinal axis of an electrical component or other component. Furthermore, the temperature control portions 16, 50, 216 surround the surface area of an electrical component, e.g., the cells, along the entirety of a longitudinal axis of the electrical component. In this manner, a temperature control portion 16, 50, 216 of the present disclosure allows for temperature control over a larger surface area of an electrical component than conventional systems that only flow around a portion of an electrical component, e.g., only a portion of a cell that is perpendicular to its longitudinal axis such as only a portion of a lateral side of each battery cell will be exposed to coolant as described above.

An additional advantage of a temperature control portion 16, 50, 216 surrounding an electrical component in this manner is that the temperature control portions 16, 50, 216 provide stability, rigidity, and protection to the electrical component. For example, temperature control portions 16, 50, 216 of the present disclosure provide protection to an electrical component or other component in the event of a high impact event or crash.

Referring to FIG. 6, in an exemplary embodiment, each temperature control portion 216 includes first and second channels 32, 42 (FIG. 4) to allow for a temperature control fluid to make two separate passes over the entirety of a longitudinal axis of each cell of an electrical component.

Figure 7:
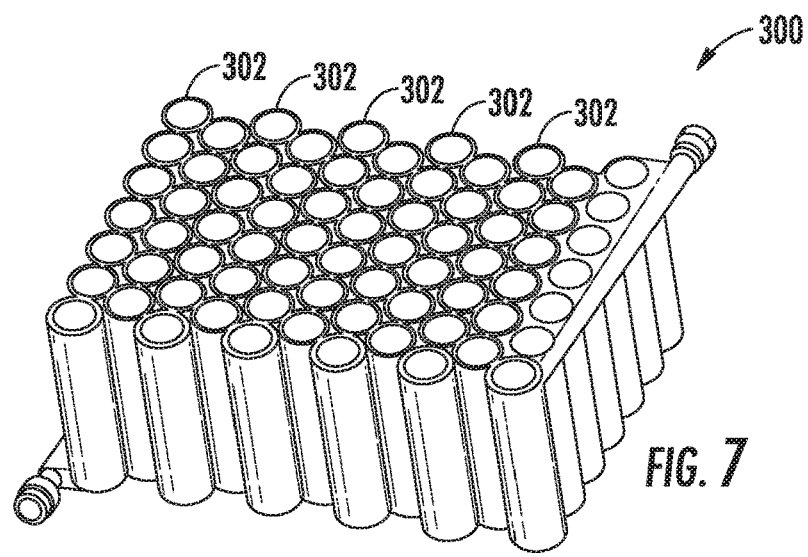
FIG. 7 is a perspective view of a temperature control mechanism in accordance with an exemplary embodiment of the present disclosure.
Figure 8:
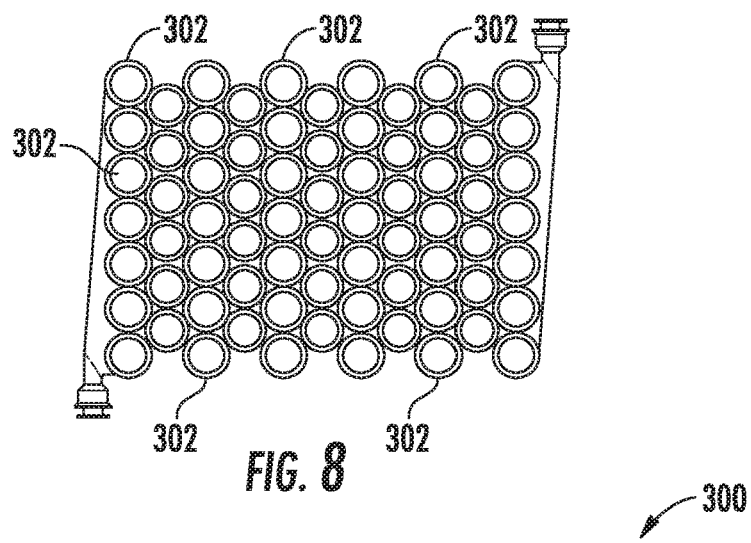
FIG. 8 is a top elevation view of a temperature control mechanism in accordance with an exemplary embodiment of the present disclosure.
Figure 9:
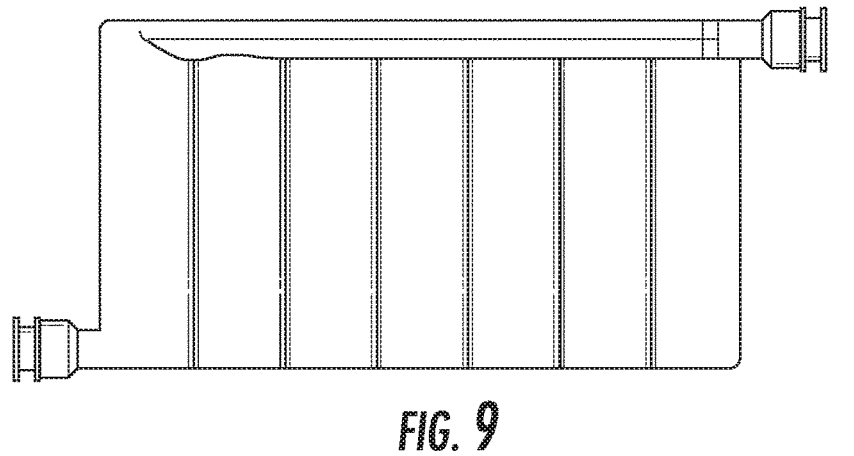
FIG. 9 is a side elevation view of a temperature control mechanism in accordance with an exemplary embodiment of the present disclosure.

FIGS. 7-9 illustrate an exemplary embodiment of a temperature control mechanism of the present disclosure. Referring to FIGS. 7-9, a temperature control mechanism 300 includes a plurality of temperature control portions 302. As shown in FIGS. 7-9, the temperature control portions 302 form a single integral structure, i.e., a single integral temperature control mechanism 300. As described above and as used herein, the term "integral" with respect to the temperature control portions 302 forming a single integral structure, i.e., a single integral temperature control mechanism 300, refers to each temperature control portion 302 being contained within a single housing or casing of the temperature control mechanism 300. In other words, each of the temperature control portions 302 are contained within a single integral temperature control mechanism 300 and each of the temperature control portions 302 are located at a position fixed relative to the outer casing of the integral temperature control mechanism 300. In this manner, the temperature control mechanism 300, having integral temperature control portions 302 therein, is distinguishable from two separate components, i.e., a first component having a first housing containing a first portion therein and a separate second component having a separate second housing containing a second portion therein. Each temperature control portion 302 of temperature control mechanism 300 is able to receive a separate portion of an electrical component or other component, e.g., a separate cell of a battery.

Furthermore, each temperature control portion 302 of temperature control mechanism 300 advantageously provides for temperature control along a depth, or Z-axis, or longitudinal axis for each separate portion of an electrical component or other component, e.g., each separate cell of a battery. Furthermore, a flow structure for a temperature control fluid through a temperature control portion 302 of a temperature control mechanism 300 of the present disclosure is separate and apart from a flow structure of other temperature control portions of the temperature control mechanism 300. In other words, each flow structure for each temperature control portion 302 is separate and apart from a flow structure of other temperature control portions of the temperature control mechanism 300. Referring to FIGS. 1A-4 and 6, in an exemplary embodiment, this separate flow structure for each temperature control portion 302 allows for each temperature control portion of a temperature control mechanism of the present disclosure to simultaneously receive a temperature control fluid.

Figure 24:
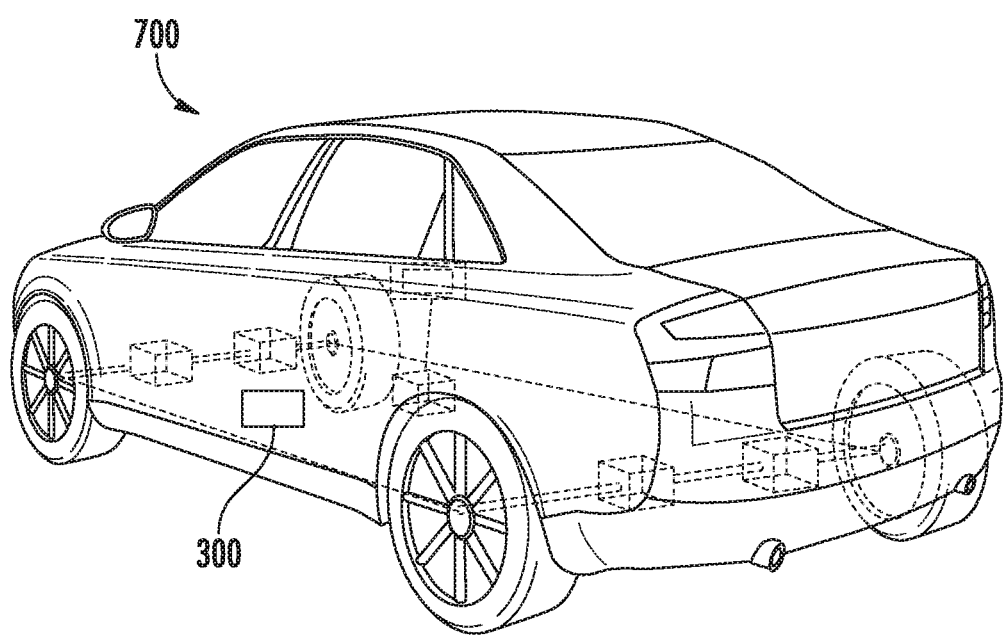
FIG. 24 depicts an example automobile having a temperature control mechanism in accordance with an exemplary embodiment of the present disclosure.
Figure 25:
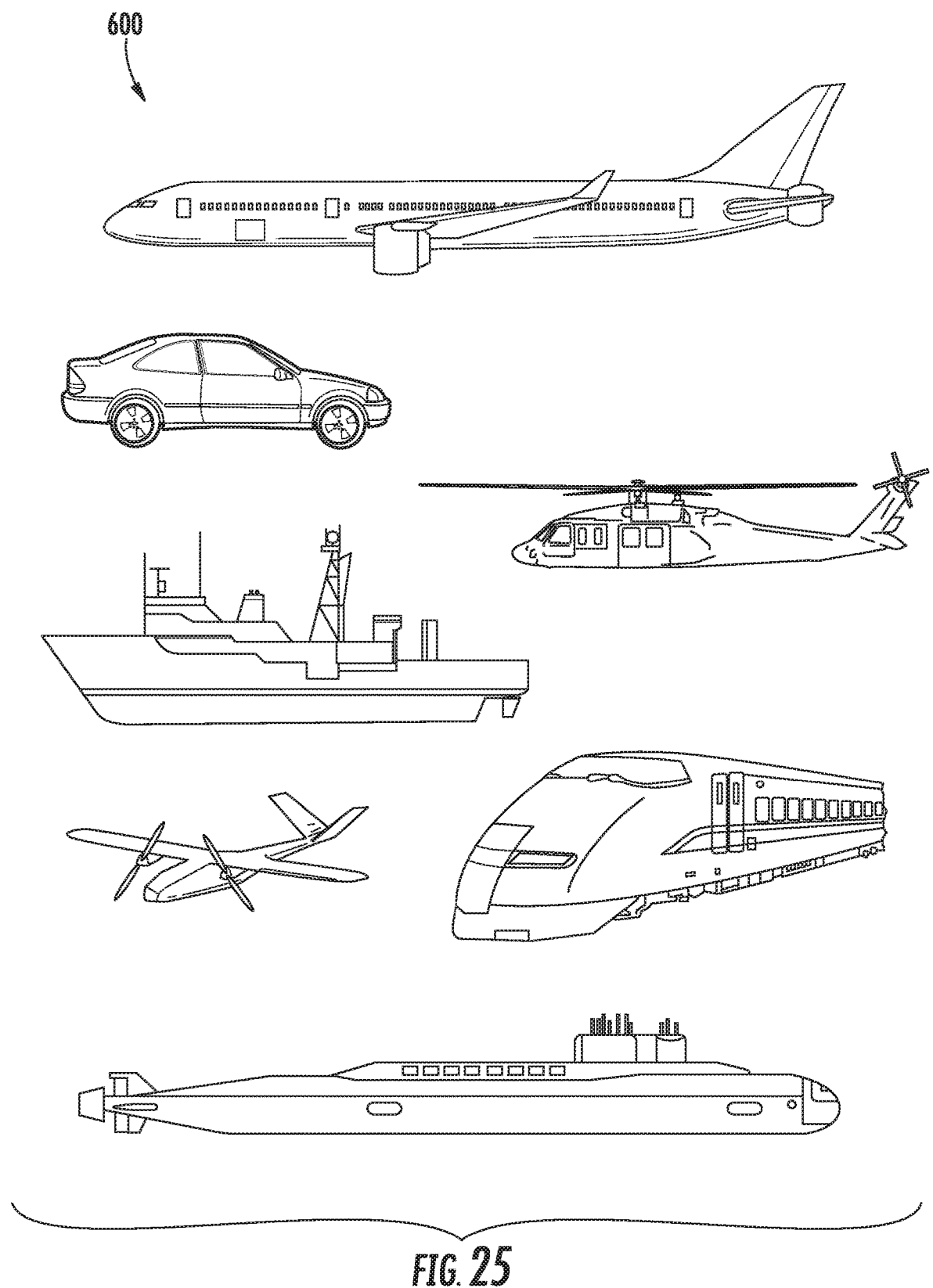
FIG. 25 depicts example vehicles that include a temperature control mechanism in accordance with exemplary embodiments of the present disclosure.

Referring now to FIG. 25, example vehicles 600 according to example embodiments that can utilize a temperature control mechanism of the present disclosure are depicted. A temperature control mechanism, and a method of using a temperature control mechanism, of the present disclosure can be implemented on an aircraft, helicopter, automobile, boat, submarine, train, unmanned aerial vehicle or drone and/or any other suitable vehicles having an electrical component requiring temperature control. One of ordinary skill in the art would understand that a temperature control mechanism, and a method of using a temperature control mechanism, of the present disclosure can be implemented on other vehicles or structures requiring temperature control without deviating from the scope of the present disclosure. Referring to FIG. 24, in an exemplary embodiment, a temperature control mechanism 300 of the present disclosure is utilized with an electrical component of an automobile 700.

Figure 5:
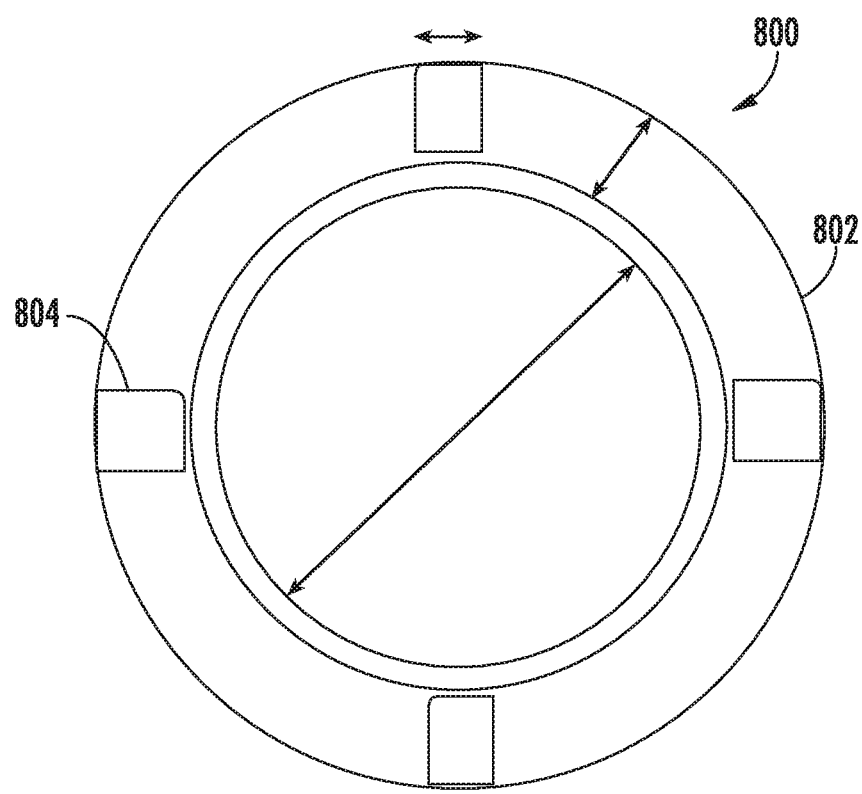
FIG. 5 is an elevation view of a temperature control mechanism extending over a cell in accordance with an exemplary embodiment of the present disclosure.
Figure 10:
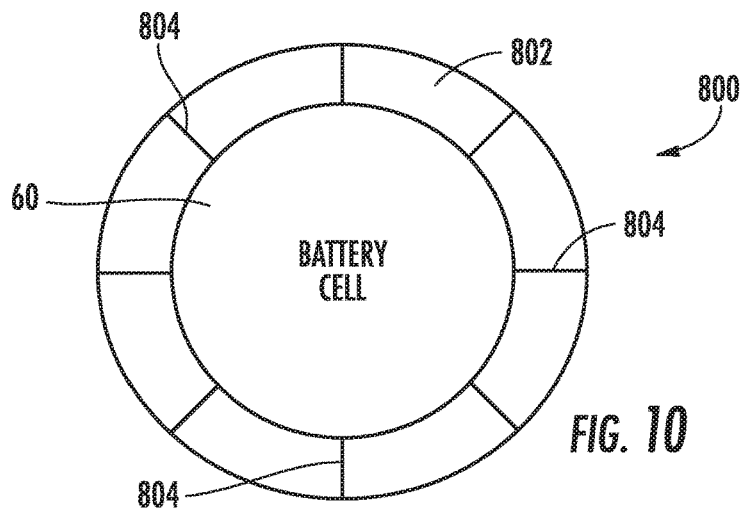
FIG. 10 is an elevation view of a temperature control mechanism extending over a cell in accordance with another exemplary embodiment of the present disclosure.

Referring to FIG. 5, in an exemplary embodiment, a temperature control portion 802 of a temperature control mechanism 800 of the present disclosure may include heat transfer and shock absorbing material or fins 804. In one embodiment, the heat transfer and shock absorbing material or fins 804 can be added within channels 32, 42, 132, 142 (FIGS. 3 and 4) of a temperature control portion. Referring to FIG. 10, in an exemplary embodiment, the heat transfer and shock absorbing material or fins 804 extend within the temperature control portion 802. In one embodiment, the fins 804 may have a variable fin density from one portion of the temperature control mechanism 800 to another portion. It is contemplated that the fins 804 may include straight fins, wavy fins that extend along a longitudinal axis of the temperature control portions 802, offset strip fins, or any other configuration of heat transfer and shock absorbing material or fins. The fins 804 of the present disclosure may be straight, curvilinear, spiral, toroidal, serpentine, helical, sinusoidal, or any other suitable shape to assist with the heat transfer process.

A temperature control mechanism of the present disclosure can include any number of shapes to correspond to and be compatible with any shape of cells of an electrical component.

Figure 11:
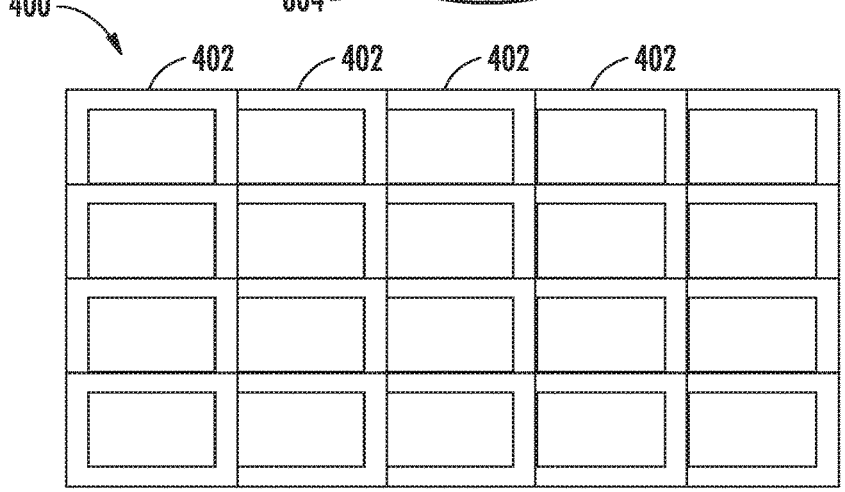
FIG. 11 is an elevation view of a temperature control mechanism in accordance with another exemplary embodiment of the present disclosure.
Figure 12:
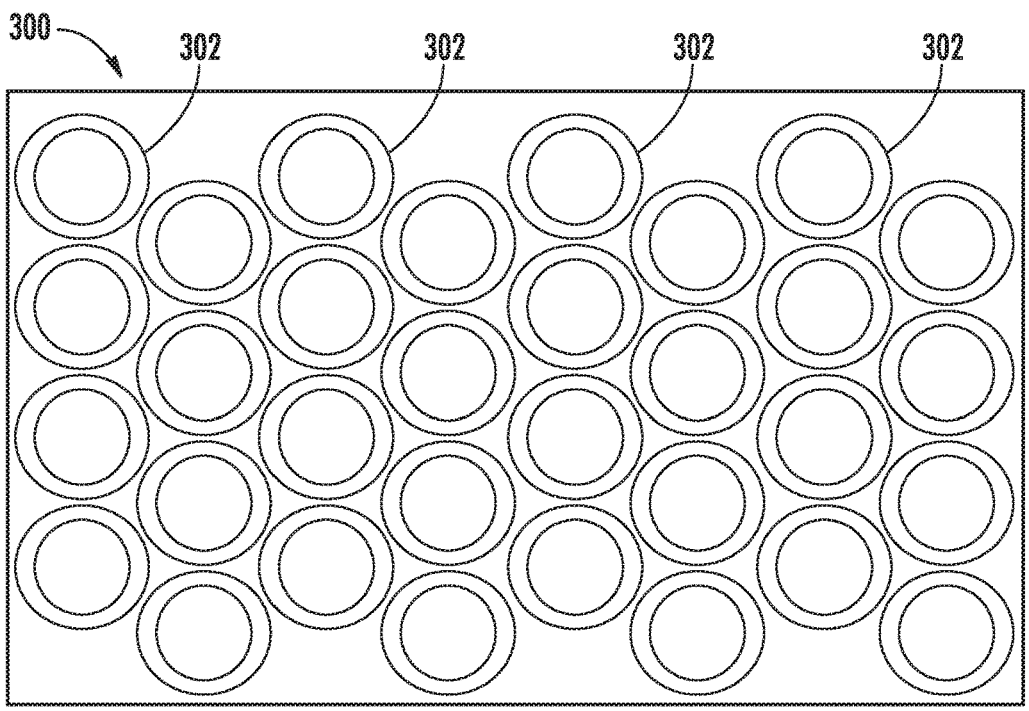
FIG. 12 is an elevation view of a temperature control mechanism in accordance with another exemplary embodiment of the present disclosure.
Figure 13:
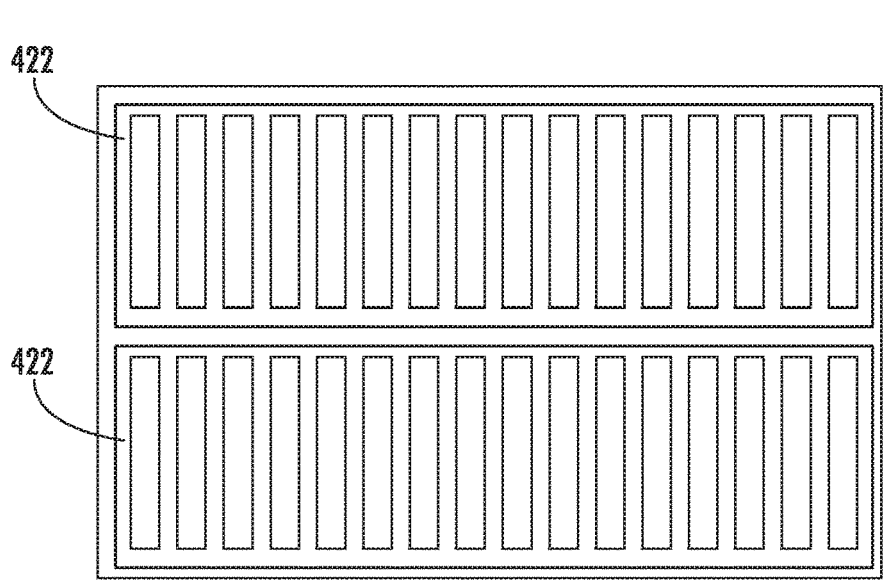
FIG. 13 is an elevation view of a temperature control mechanism in accordance with another exemplary embodiment of the present disclosure.

Referring to FIGS. 7-8 and 12, in an exemplary embodiment, each temperature control portion 302 of temperature control mechanism 300 has a cylindrical shape to correspond and surround cells having a cylindrical shape. It is contemplated that each temperature control portion 302 of temperature control mechanism 300 may include any other shape. For example, referring to FIG. 11, in other exemplary embodiments, each temperature control portion 402 of temperature control mechanism 400 has a square shape. In another embodiment, referring to FIG. 13, each temperature control portion 422 of temperature control mechanism 420 has a rectangular shape. In other embodiments, each temperature control portion of a temperature control mechanism of the present disclosure may have a square, triangular, quadratic, elliptical, or any other geometrical shape for a desired application.

Figure 22:
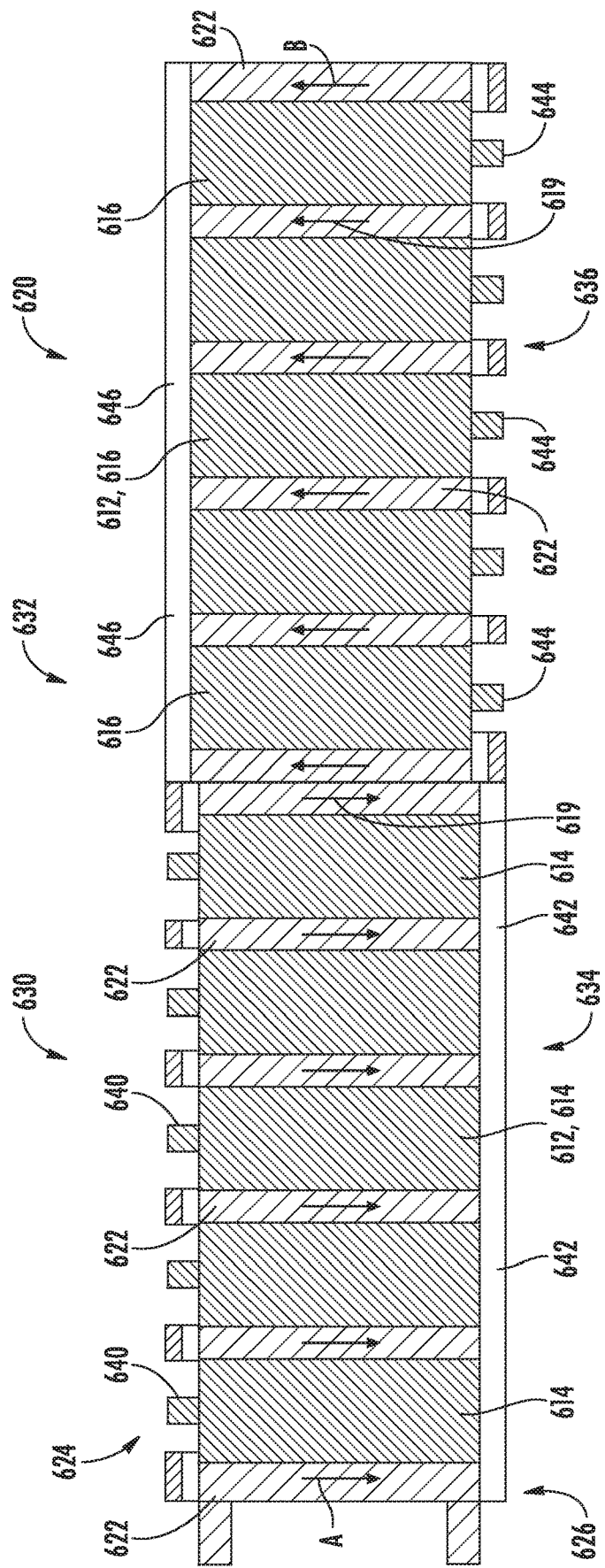
FIG. 22 is a cross-sectional view of a temperature control mechanism in communication with an electrical component with a first side of the temperature control mechanism having a first portion configured to receive positive poles of a first group of cells and a second portion configured to receive negative poles of the second group of cells in accordance with an exemplary embodiment of the present disclosure.

Referring to FIG. 22, in another exemplary embodiment, the temperature control mechanism 620 for an electrical component 612 includes a plurality of temperature control portions 622. The embodiment illustrated in FIG. 22 includes a temperature control mechanism 620 and temperature control portions 622 that function similarly to the temperature control mechanism and temperature control portions described in detail above with respect to FIGS. 1A-1C. For the sake of brevity, these similar components and the similar steps of using temperature control mechanism 620 will not all be discussed in conjunction with the embodiment illustrated in FIG. 22.

Referring to FIG. 22, the electrical component 612 includes a battery pack including a first group of cells 614 and a second group of cells 616. The temperature control mechanism 620 includes a first side 624 and a second side 626 opposite the first side 624.

The first side 624 of the temperature control mechanism 620 includes a first side first portion 630 that is configured to receive positive poles 640 of the first group of cells 614 and a first side second portion 632 that is configured to receive negative poles 646 of the second group of cells 616. The second side 626 of the temperature control mechanism 620 includes a second side first portion 634 that is configured to receive negative poles 642 of the first group of cells 614 and a second side second portion 636 that is configured to receive positive poles 644 of the second group of cells 616. In this manner, the temperature control mechanism 620 of the present disclosure allows for receiving an electrical component 612 having the opposed orientation as shown in FIG. 22.

Referring to FIG. 22, in an exemplary embodiment, a temperature control fluid 619 travels through temperature control portions 622 at first side first portion 630 in a first direction generally along arrow A from first side first portion 630 to second side first portion 634. Referring to FIG. 22, in an exemplary embodiment, a temperature control fluid 619 travels through temperature control portions 622 at first side second portion 632 in a second direction generally along arrow B from second side second portion 636 to first side second portion 632.

Referring to FIGS. 16-19, in another exemplary embodiment, the temperature control mechanism 710 for an electrical component 712 includes a plurality of temperature control portions 722. The embodiment illustrated in FIG. 16 includes a temperature control mechanism 710 and temperature control portions 722 that function similarly to the temperature control mechanism and temperature control portions described in detail above with respect to FIGS. 1A-1C. For the sake of brevity, these similar components and the similar steps of using temperature control mechanism 710 will not all be discussed in conjunction with the embodiments illustrated in FIGS. 16-19.

Figure 19:
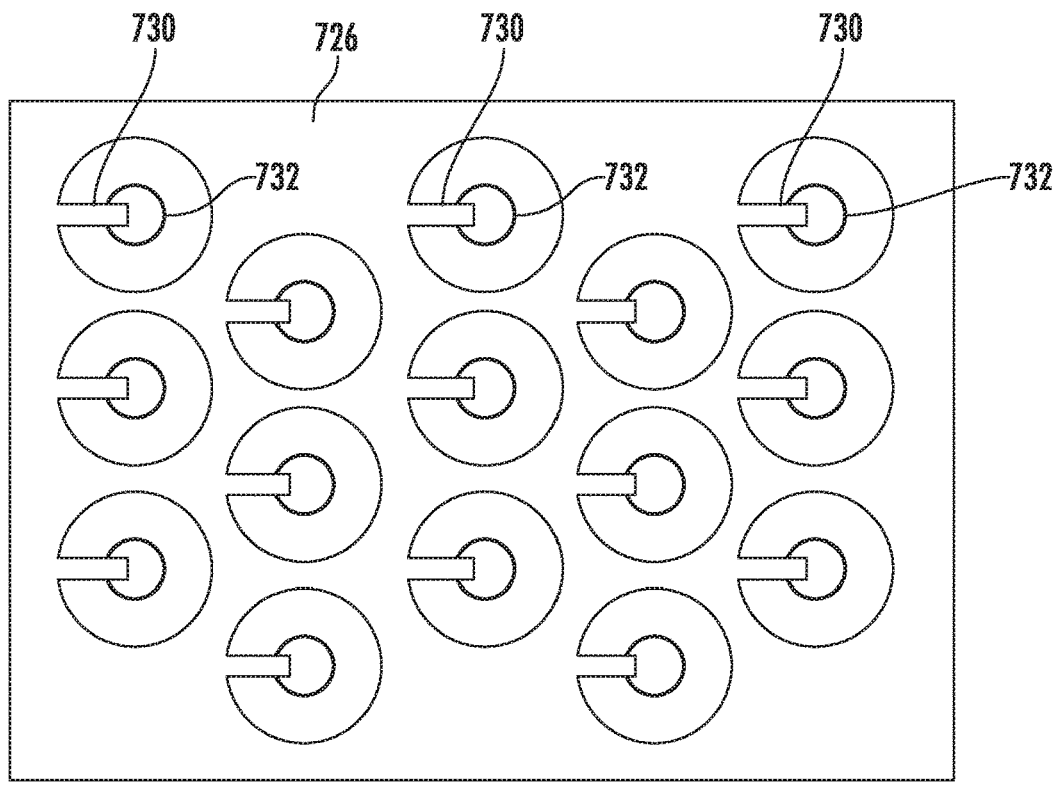
FIG. 19 is a top elevation view of a temperature control mechanism in communication with an electrical component having a collector plate with a junction connecting a cell to the collector plate in accordance with an exemplary embodiment of the present disclosure.
Figure 20:
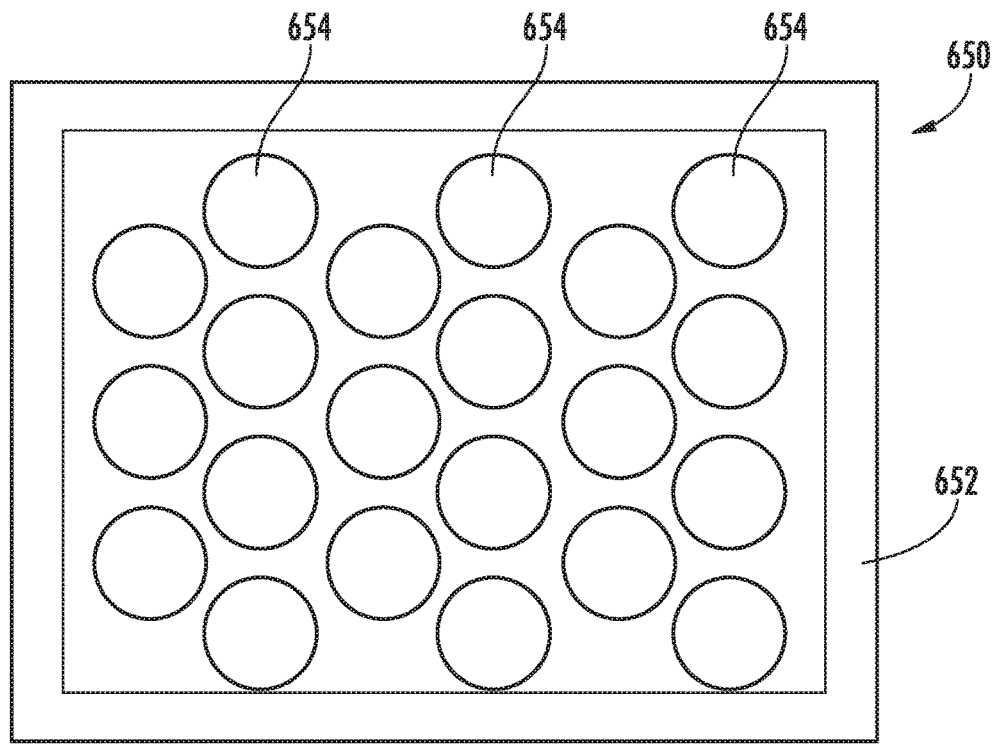
FIG. 20 is an elevation view of a temperature control mechanism and crash structure in accordance with another exemplary embodiment of the present disclosure.

Referring to FIGS. 16-19, the electrical component 712 includes a battery pack including a plurality of cells 724, a collector plate 726, an electric insulator 728, and a junction 730. The orientation of the collector plate 726 and the electric insulator 728 are shown in FIGS. 16-18. Referring to FIG. 19, a plurality of junction portions 730 connect the collector plate 726 to each of the cell tips 732 of the cells 724.

Figure 21:
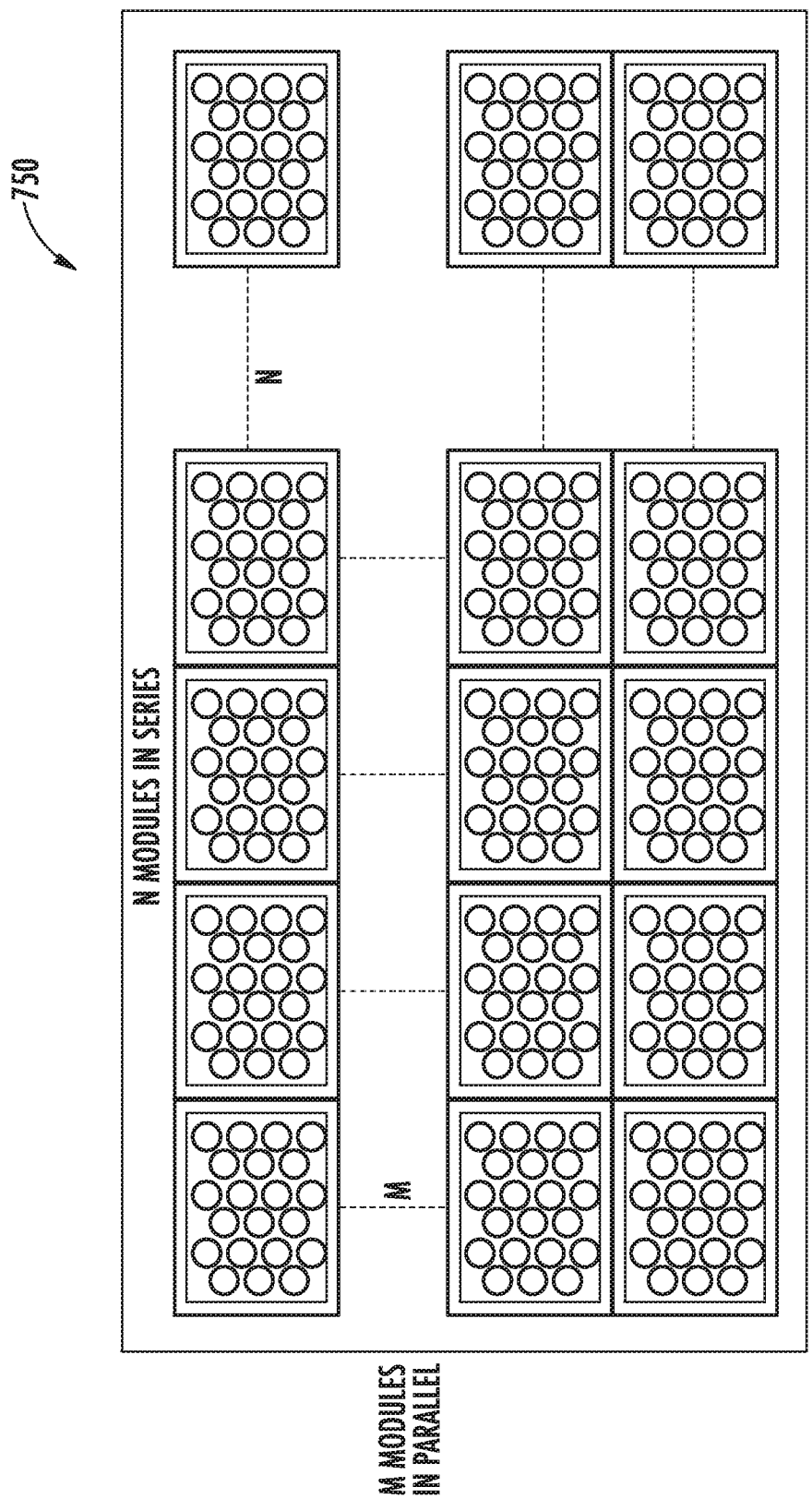
FIG. 21 is an elevation view of a temperature control mechanism in communication with an electrical component having modules of battery packs composed of cells in a series configuration, a parallel configuration, and/or in a parallel/series hybrid configuration in accordance with an exemplary embodiment of the present disclosure.

Referring to FIG. 21, in another exemplary embodiment, the temperature control mechanism 750 for an electrical component includes modules of battery packs composed of cells in a series configuration, a parallel configuration, and/or in a parallel/series hybrid configuration. The embodiment illustrated in FIG. 21 includes a temperature control mechanism 750 that functions similarly to the temperature control mechanism described in detail above with respect to FIGS. 1A-1C. For the sake of brevity, these similar components and the similar steps of using temperature control mechanism 750 will not all be discussed in conjunction with the embodiment illustrated in FIG. 21.

Referring to FIG. 21, the electrical component includes modules N organized in series and modules M organized in parallel. The modules are connected hydraulically, e.g., coolant lines, and/or electrically in such a hybrid configuration. Each module may be surrounded by a temperature control mechanism 750 as described herein. In an exemplary embodiment, the modules can all be in series, or all be in parallel. In an exemplary embodiment, the modules can be in a series configuration, a parallel configuration, and/or in a parallel/series hybrid configuration.

Referring to FIG. 22, in another exemplary embodiment, the temperature control mechanism 650 includes a crash structure 652 that surrounds the temperature control mechanism 650 and the plurality of cells 654. The crash structure 652 provides stability, rigidity, and protection to the temperature control mechanism 650 and the plurality of cells 654. For example, the crash structure 652 of the present disclosure provides protection to an electrical component or other component in the event of a high impact event or crash.

In an exemplary embodiment, the crash structure 652 that surrounds the temperature control mechanism 650 and the plurality of cells 654 includes a honeycomb structure, a lattice structure, a monolith, a metallic foam or other suitable structure to provide stability, rigidity, and protection to the temperature control mechanism 650 and the plurality of cells 654.

Figure 14:
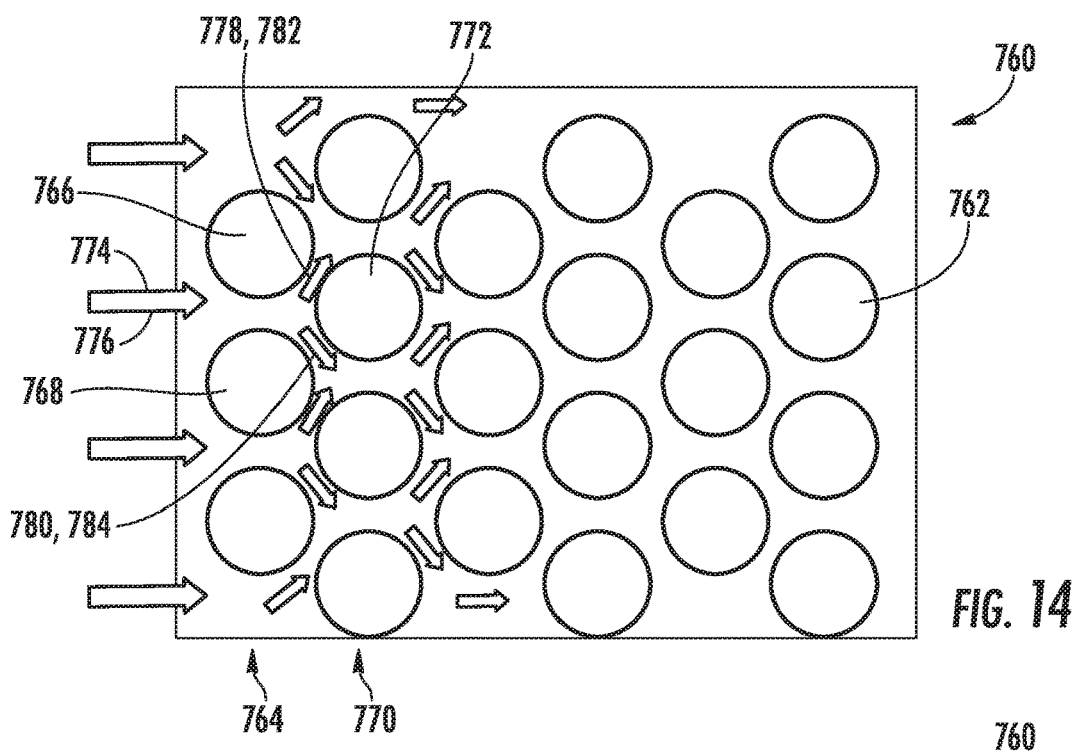
FIG. 14 is an elevation view of a temperature control mechanism in communication with cells of an electrical component for crossflow temperature control in accordance with another exemplary embodiment of the present disclosure.
Figure 15:
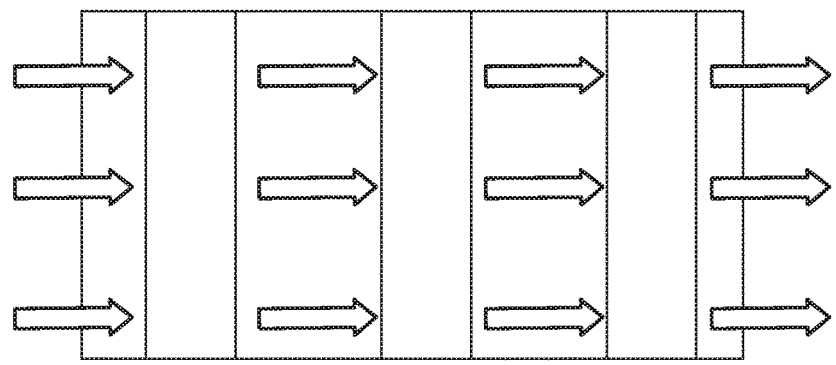
FIG. 15 is a cross-sectional view of a temperature control mechanism in communication with cells of an electrical component for crossflow temperature control in accordance with another exemplary embodiment of the present disclosure.

Referring to FIGS. 14 and 15, a cross-flow temperature control configuration of the present disclosure is shown. Referring to FIG. 14, a temperature control mechanism 760 is shown for an electrical component 762 having a first column of cells 764 including a first cell 766 and a second cell 768 and a second column of cells 770 including a third cell 772 in staggered arrangement with the first cell 766 and the second cell 768.

The temperature control mechanism 760 is in communication with electrical component 762. The cross-flow temperature control configuration includes flowing a temperature control fluid 774 through a portion of the temperature control mechanism 760 along a flow path 776 between the first cell 766 and the second cell 768. The temperature control mechanism 760 directs a first portion 778 of the flow path 776 of the temperature control fluid 774 in a first direction 782 between the first cell 766 and the third cell 772 and directs a second portion 780 of the flow path 776 of the temperature control fluid 774 in a second direction 784 between the second cell 768 and the third cell 772. In this manner, the temperature control mechanism 760 provides a cross-flow over and around each of the cells of the electrical component 762 as shown in FIGS. 14 and 15. In exemplary embodiments, the cross-flow temperature control configuration of the present disclosure can be a single pass or a double pass, or other multi-pass configuration using baffles between cells to create each fluid passage or passageway. The multi-pass configuration can be from top to bottom using horizontal baffles to create layers of fluid passages or passageways. In an exemplary embodiment, a brick with a cross-flow configuration using horizontal baffles includes coolant flow horizontally from a top layer to a bottom layer, e.g., cascading from one layer to the other layer. The single or multi-pass configuration can include vertical baffles, e.g., flow direction longitudinally.

In one exemplary embodiment, a temperature control mechanism 300 of the present disclosure is formed using precision casting, advanced machining, or other traditional manufacturing machines or methods. In one exemplary embodiment, a temperature control mechanism 300 of the present disclosure is formed using additive manufacturing machines or methods. As described in detail below, exemplary embodiments of the formation of a temperature control mechanism 300 involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming a temperature control mechanism of the present disclosure using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing"

may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single integral temperature control mechanism 300 to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of a temperature control mechanism of the present disclosure. Accordingly, a three-dimensional design model of the component may be defined prior to manufacturing. In this regard, a model or prototype of the component may be scanned to determine the three-dimensional information of the component. As another example, a model of a temperature control mechanism of the present disclosure may be constructed using a suitable computer aided design (CAD) program to define the three-dimensional design model of the component.

The design model may include 3D numeric coordinates of the entire configuration of a temperature control mechanism of the present disclosure including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, a temperature control mechanism of the present disclosure described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of a temperature control mechanism of the present disclosure may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of a temperature control mechanism of the present disclosure is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

While the present disclosure is not limited to the use of additive manufacturing to form a temperature control mechanism of the present disclosure generally, additive manufacturing does provide a variety of manufacturing advantages, including ease of manufacturing, reduced cost, greater accuracy, etc.

Also, the additive manufacturing methods described above enable much more complex and intricate shapes and contours of a temperature control mechanism described herein to be formed with a very high level of precision. For example, such components may include thin additively manufactured layers, cross sectional features, and component contours. In addition, the additive manufacturing process enables the manufacture of a single integral temperature control mechanism having different materials such that different portions of the component may exhibit different performance characteristics. The successive, additive nature of the manufacturing process enables the construction of these novel features. As a result, a temperature control mechanism of the present disclosure formed using the methods described herein may exhibit improved performance and reliability.

Figure 23:
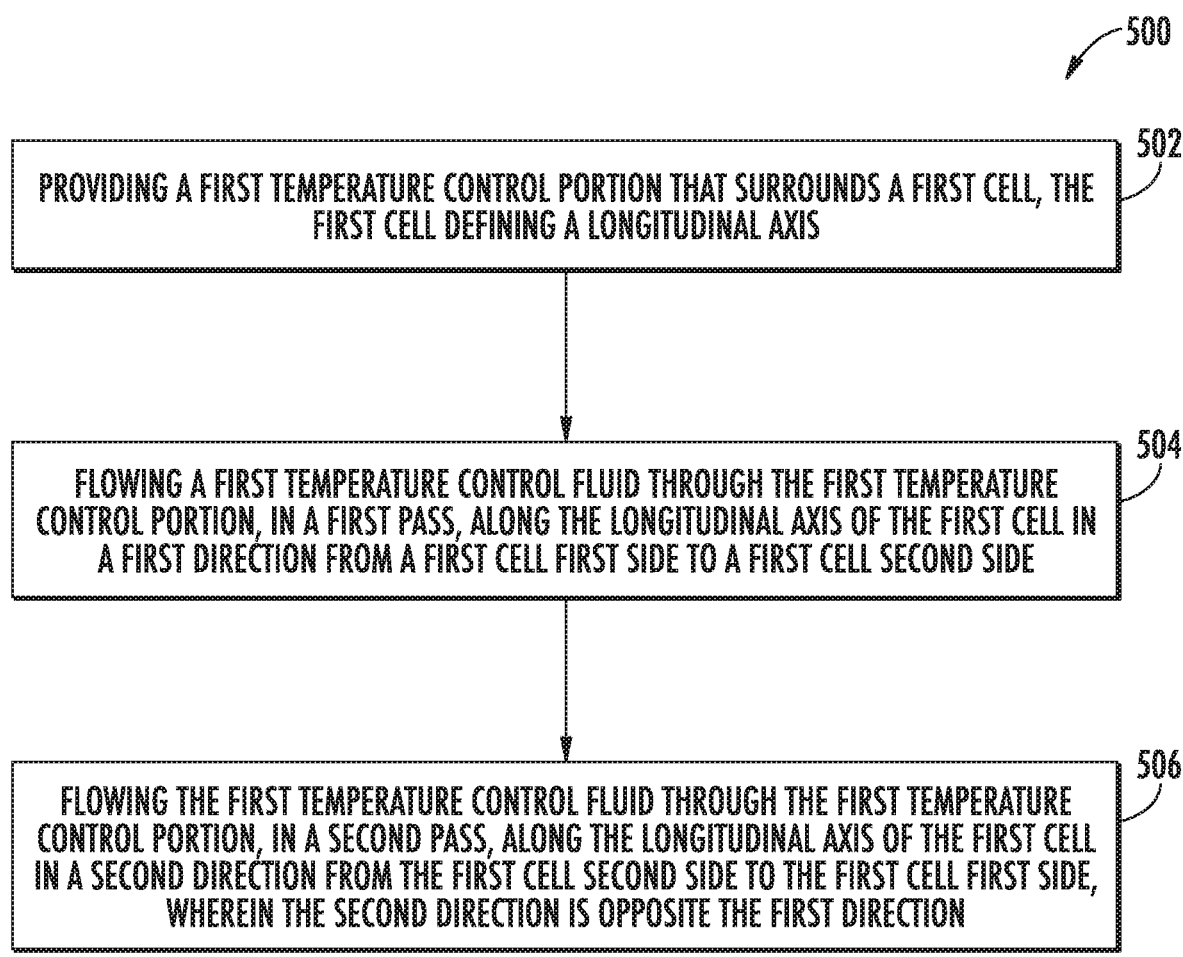
FIG. 23 is a flow diagram of a method for operating a temperature control mechanism for an electrical component in accordance with an exemplary aspect of the present disclosure.

Referring now to FIG. 23, a method 500 for operating a temperature control mechanism for an electrical component in accordance with an exemplary aspect of the present disclosure is depicted. The exemplary method 500 may be utilized to operate one of a temperature control mechanism having temperature control portions described above with reference to FIGS. 1 through 6.

For the exemplary aspect of FIG. 23, the method 500 generally includes at (502) providing a first temperature control portion that surrounds a first cell, the first cell defining a longitudinal axis as described in detail above with reference to FIGS. 1 through 6.

The method 500 further includes at (504) flowing a first temperature control fluid through the first temperature control portion, in a first pass, along the longitudinal axis of the first cell in a first direction from a first cell first side to a first cell second side.

For the exemplary aspect depicted, the method 500 further includes at (506) flowing the first temperature control fluid through the first temperature control portion, in a second pass, along the longitudinal axis of the first cell in a second direction from the first cell second side to the first cell first side, wherein the second direction is opposite the first direction.

For the exemplary aspect of the present disclosure, the method 500 may further include providing a second temperature control portion that surrounds a second cell, the second cell defining a second longitudinal axis; flowing a second temperature control fluid through the second temperature control portion, in a third pass, along the second longitudinal axis of the second cell in a third direction from a second cell first side to a second cell second side; and flowing the second temperature control fluid through the second temperature control portion, in a fourth pass, along the second longitudinal axis of the second cell in a fourth direction from the second cell second side to the second cell first side, wherein the fourth direction is opposite the third direction.

For the exemplary aspect of the present disclosure, the method 500 may include flowing the first temperature control fluid through the first temperature control portion, in the first pass, along the longitudinal axis of the first cell in the first direction from the first cell first side to the first cell second side occurring simultaneously with flowing the second temperature control fluid through the second temperature control portion, in the third pass, along the second longitudinal axis of the second cell in the third direction from the second cell first side to the second cell second side.

For the exemplary aspect of the present disclosure, the method 500 may include flowing the first temperature control fluid through the first temperature control portion, in the second pass, along the longitudinal axis of the first cell in the second direction from the first cell second side to the first cell first side occurring simultaneously with flowing the second temperature control fluid through the second temperature control portion, in the fourth pass, along the second longitudinal axis of the second cell in the fourth direction from the second cell second side to the second cell first side.

For the exemplary aspect of the present disclosure, the method 500 may include flowing the first temperature control fluid through the first temperature control portion, in the first pass, along the longitudinal axis of the first cell in the first direction from the first cell first side to the first cell second side including flowing the first temperature control fluid through a first temperature control portion first channel; and flowing the first temperature control fluid through the first temperature control portion, in the second pass, along the longitudinal axis of the first cell in the second direction from the first cell second side to the first cell first side including flowing the first temperature control fluid through a first temperature control portion second channel.

For the exemplary aspect of the present disclosure, the method 500 may include flowing the second temperature control fluid through the second temperature control portion, in the third pass, along the second longitudinal axis of the second cell in the third direction from the second cell first side to the second cell second side including flowing the second temperature control fluid through a second temperature control portion first channel; and wherein flowing the second temperature control fluid through the second temperature control portion, in the fourth pass, along the second longitudinal axis of the second cell in the fourth direction from the second cell second side to the second cell first side including flowing the second temperature control fluid through a second temperature control portion second channel.

A temperature control mechanism of the present disclosure advantageously is configured to provide substantially uniform temperature distribution between each of the plurality of cells of an electrical component. The temperature control portions and/or the passageways of a temperature control mechanism of the present disclosure may be straight, curvilinear, serpentine, helical, sinusoidal, or any other suitable shape. Conventional systems and conventional flow paths have a large cell-to-cell temperature variation across the systems where portions at an inlet have large temperature gradients from portions downstream of the inlet.

A temperature control mechanism of the present disclosure is also configured to substantially maintain a uniform and reduced pressure loss, e.g., minimize pressure loss, of a temperature control fluid while respectively traveling through temperature control portions of the temperature control mechanism. A temperature control mechanism of the present disclosure, by eliminating large pressure drops as a temperature control fluid travels through the temperature control mechanism, enables the use of higher flow rates of the temperature control fluid through the temperature control mechanism. A temperature control mechanism of the present disclosure, by providing a low pressure drop in the fluid system, enables less pumping energy required.

The plurality of temperature control portions of a temperature control mechanism of the present disclosure are configured to simultaneously receive a temperature control fluid such that the plurality of temperature control portions provide temperature control to all of the plurality of cells in parallel. In this manner, a temperature control mechanism of the present disclosure is configured to provide substantially uniform temperature distribution between each of the plurality of cells of an electrical component and the pressure loss and is configured to substantially maintain a uniform and reduced pressure loss of a temperature control fluid while respectively traveling through temperature control portions of the temperature control mechanism. Thus, the temperature distribution and the pressure loss in a temperature control mechanism of the present disclosure is significantly less than conventional systems having cooling in series, e.g., the cooling fluid traveling in a serpentine path between every other row of cells and only traveling over a portion of a lateral side of each cell.

A temperature control mechanism of the present disclosure provides much shorter flow paths for a working temperature control fluid resulting in better thermal control, more efficient cooling or heating, more uniform battery temperature throughout the entirety of the battery pack, reduced thermal gradients in the battery taking advantage of low pressure loss capability, and a lower pressure drop in the fluid system. This leads to a longer battery life and the charging/discharge rate is also improved.

A temperature control mechanism of the present disclosure advantageously provides for temperature control along a depth, or Z-axis, or longitudinal axis of an electrical component or other component requiring temperature uniformity. The longitudinal axis of the electrical component or cell can extend through a cell having straight, curvilinear, and/or any other suitable shaped portions. A temperature control mechanism of the present disclosure allows for temperature control over a larger surface area of an electrical component than conventional systems that only flow around a portion of an electrical component, e.g., only a portion of a cell that is perpendicular to its longitudinal axis such as only a portion of a lateral side of each battery cell will be exposed to coolant as described above. In this manner, a temperature control mechanism of the present disclosure provides improved temperature uniformity over the entirety of the electrical component and more ability to thermally control the electrical component. Furthermore, a temperature control mechanism of the present disclosure provides a single flow path or passageway for temperature control along a depth, or Z-axis, or longitudinal axis of each component of an electrical component, e.g., each cell, to surround the electrical component. The flow paths or passageways of a temperature control mechanism of the present disclosure may be straight, curvilinear, serpentine, helical, sinusoidal, or any other suitable shape.

A temperature control mechanism of the present disclosure provides for multiple temperature control options. In one exemplary embodiment, a temperature control mechanism of the present disclosure receives a cooling fluid to provide a cooling mechanism to a component. In this embodiment, temperature control portions of the temperature control mechanism receive a cooling fluid through its channels. In another exemplary embodiment, a temperature control mechanism of the present disclosure receives a heating fluid to provide a heating mechanism to a component. In this embodiment, temperature control portions of the temperature control mechanism receive a heating fluid through its channels.

A temperature control mechanism of the present disclosure also surrounds an electrical component, in the manner described herein, such that temperature control portions of the temperature control mechanism provide stability, rigidity, and protection to the electrical component. For example, temperature control portions of the temperature control mechanism of the present disclosure provide protection to an electrical component or other component in the event of a high impact event or crash.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A temperature control mechanism for an electrical component having a plurality of cells each defining a longitudinal axis, the temperature control mechanism comprising:
    a plurality of temperature control portions that respectively surround the plurality of cells, each of the plurality of temperature control portions respectively extend along the longitudinal axis of the plurality of cells in a first direction from a cell first side to a cell second side,
    wherein each of the plurality of temperature control portions include a first fluid passageway extending in the first direction and a second fluid passageway extending in a second direction opposite the first direction,
    wherein the temperature control mechanism includes a first transfer line in fluid communication with the first fluid passageway of each of the plurality of temperature control portions and a second transfer line in fluid communication with the second fluid passageway of each of the plurality of temperature control portions, and
    wherein the plurality of temperature control portions are configured to simultaneously receive a temperature control fluid such that the plurality of temperature control portions provide temperature control to the plurality of cells in parallel.

2. The temperature control mechanism of claim 1, wherein the plurality of temperature control portions include curvilinear fluid passageways.

3. The temperature control mechanism of claim 1, wherein the plurality of temperature control portions provide temperature control to the plurality of cells in parallel curvilinear paths.

4. The temperature control mechanism of claim 1, wherein the temperature control mechanism is configured to provide substantially uniform temperature distribution between each of the plurality of cells.

5. The temperature control mechanism of claim 1, wherein the temperature control mechanism is configured to substantially maintain a uniform and reduced pressure loss of the temperature control fluid while respectively traveling through each of the plurality of temperature control portions.

6. The temperature control mechanism of claim 1, wherein each of the plurality of temperature control portions are formed integral to the temperature control mechanism.

7. The temperature control mechanism of claim 1, wherein the temperature control fluid makes a first pass through the plurality of temperature control portions, respectively, along the longitudinal axis of the plurality of cells in the first direction from the cell first side to the cell second side, and a second pass through the plurality of temperature control portions, respectively, along the longitudinal axis of the plurality of cells in the second direction from the cell second side to the cell first side.

8. The temperature control mechanism of claim 1, wherein the electrical component comprises a pack composed of batteries and supercapacitors.

9. The temperature control mechanism of claim 1, wherein the electrical component comprises a pack composed of at least one battery pack and at least one supercapacitor pack.

10. The temperature control mechanism of claim 1, wherein the electrical component comprises a battery pack including a first group of cells and a second group of cells,
- wherein the temperature control mechanism includes a first side and a second side opposite the first side,
- wherein the first side of the temperature control mechanism includes a first side first portion configured to receive positive poles of the first group of cells and a first side second portion configured to receive negative poles of the second group of cells, and
- wherein the second side of the temperature control mechanism includes a second side first portion configured to receive negative poles of the first group of cells and a second side second portion configured to receive positive poles of the second group of cells.

11. The temperature control mechanism of claim 1, wherein the electrical component includes a battery pack composed of cells in a series configuration, a parallel configuration, and/or in a parallel/series hybrid configuration.

12. The temperature control mechanism of claim 1, further comprising a crash structure surrounding the plurality of cells.

13. The temperature control mechanism of claim 1, wherein the temperature control fluid comprises a cooling fluid or a heating fluid.

14. The temperature control mechanism of claim 1, wherein the plurality of temperature control portions include curvilinear fins.

15. The temperature control mechanism of claim 1, wherein the plurality of temperature control portions include curvilinear fluid passageways formed by curvilinear fins.

16. The temperature control mechanism of claim 1, wherein the temperature control mechanism includes a fluid inlet portion and a fluid outlet portion.

17. The temperature control mechanism of claim 1, wherein the temperature control mechanism includes more than one fluid inlet portion and more than one fluid outlet portion.

18. A temperature control mechanism for an electrical component having a plurality of cells each defining a longitudinal axis, the temperature control mechanism comprising:
- a plurality of temperature control portions that respectively surround the plurality of cells, each of the plurality of temperature control portions including a first direction flow line respectively extending along the longitudinal axis of the plurality of cells in a first direction from a cell first side to a cell second side;
- an inlet portion in fluid communication with the plurality of temperature control portions;
- an outlet portion in fluid communication with the plurality of temperature control portions and the inlet portion;
- an inlet line fluidly connecting the inlet portion to the first direction flow line of each of the plurality of temperature control portions; and
- an outlet line fluidly connecting the outlet portion to the first direction flow line of each of the plurality of temperature control portions,
- wherein the first direction flow line of each of the plurality of temperature control portions is configured to simultaneously receive a temperature control fluid from the inlet line such that the plurality of temperature control portions provide temperature control to the plurality of cells in parallel, and
- wherein the temperature control fluid travels through the first direction flow line of each of the plurality of temperature control portions in the first direction to the outlet line and then to the outlet portion.

* * * * *